(12) United States Patent
Shigemitsu et al.

(10) Patent No.: US 8,520,127 B2
(45) Date of Patent: Aug. 27, 2013

(54) IMAGE PICKUP LENS COMPRISING APERTURE STOP AND SINGLE LENS, IMAGE PICKUP MODULE COMPRISING IMAGE PICKUP LENS INCLUDING APERTURE STOP AND SINGLE LENS, METHOD FOR MANUFACTURING IMAGE PICKUP LENS COMPRISING APERTURE STOP AND SINGLE LENS, AND METHOD FOR MANUFACTURING IMAGE PICKUP MODULE COMPRISING IMAGE PICKUP LENS INCLUDING APERTURE STOP AND SINGLE LENS

(75) Inventors: Norimichi Shigemitsu, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 12/899,763

(22) Filed: Oct. 7, 2010

(65) Prior Publication Data

US 2011/0085071 A1 Apr. 14, 2011

(30) Foreign Application Priority Data

Oct. 8, 2009 (JP) ................................. 2009-234347

(51) Int. Cl.
*H04N 5/225* (2006.01)

(52) U.S. Cl.
USPC ............................ 348/340; 348/335; 359/366

(58) Field of Classification Search
USPC ......................................... 348/340; 359/366
See application file for complete search history.

(56) References Cited

U.S. PATENT DOCUMENTS

| | | | |
|---|---|---|---|
| 5,418,356 A | 5/1995 | Takano |
| 5,739,965 A | 4/1998 | Ohno |
| 6,122,009 A | 9/2000 | Ueda |
| 6,744,570 B1 | 6/2004 | Isono |
| 7,394,602 B2 | 7/2008 | Chen et al. |
| 7,436,604 B1 | 10/2008 | Tang |
| 7,466,911 B2 | 12/2008 | Isono |
| RE40,638 E | 2/2009 | Saito |

(Continued)

FOREIGN PATENT DOCUMENTS

| | | |
|---|---|---|
| CN | 2731485 Y | 10/2005 |
| CN | 1754110 A | 3/2006 |

(Continued)

OTHER PUBLICATIONS

U.S. Appl. No. 13/432,566, filed Mar. 28, 2012, entitled "Lens Aligning Device and Image Capturing Lens".

(Continued)

*Primary Examiner* — Roberto Velez
*Assistant Examiner* — Cynthia Segura
(74) *Attorney, Agent, or Firm* — Nixon & Vanderhye P.C.

(57) ABSTRACT

In order that an image pickup lens, an image pickup module, a method for manufacturing an image pickup lens, and a method for manufacturing an image pickup module may be realized each of which makes it possible to realize a higher resolution of a periphery of a formed image, an image pickup lens of the present invention satisfies the following formulas (1) and (2):

$$0.080 < d1/d2 < 0.22 \quad (1);$$

and $$d1'/d1 < 1.00 \quad (2)$$

where: $d1$ is a center thickness of the single lens; $d1'$ is a thickness of a lateral side of the single lens; and $d2$ is a length in air between the image surface and a center of that surface of the single lens which faces the image surface.

13 Claims, 13 Drawing Sheets

(56) References Cited

U.S. PATENT DOCUMENTS

| | | |
|---|---|---|
| 7,688,523 B2 | 3/2010 | Sano |
| 7,755,854 B2 | 7/2010 | Sano |
| 7,764,442 B2 | 7/2010 | Teraoka |
| 7,835,072 B2 * | 11/2010 | Izumi ............................ 359/356 |
| 7,852,573 B2 | 12/2010 | Teraoka et al. |
| 7,916,405 B2 | 3/2011 | Aoi et al. |
| 7,957,076 B2 | 6/2011 | Tang |
| 7,995,294 B2 | 8/2011 | Saito |
| 8,310,770 B2 | 11/2012 | Tang et al. |
| 2001/0003494 A1 | 6/2001 | Kitagawa |
| 2003/0048549 A1 | 3/2003 | Saito |
| 2003/0063396 A1 | 4/2003 | Saito |
| 2003/0184883 A1 | 10/2003 | Sato et al. |
| 2003/0197956 A1 | 10/2003 | Yamakawa |
| 2004/0047274 A1 | 3/2004 | Amanai |
| 2004/0105173 A1 | 6/2004 | Yamaguchi et al. |
| 2004/0160680 A1 | 8/2004 | Shinohara |
| 2004/0189854 A1 | 9/2004 | Tsukamoto et al. |
| 2004/0228009 A1 | 11/2004 | Kamo |
| 2005/0002117 A1 | 1/2005 | Ninomiya et al. |
| 2005/0041306 A1 | 2/2005 | Matsuo |
| 2005/0068640 A1 | 3/2005 | Sato |
| 2005/0073753 A1 | 4/2005 | Sato |
| 2005/0073754 A1 | 4/2005 | Sato |
| 2005/0105194 A1 | 5/2005 | Matsui |
| 2005/0128334 A1 * | 6/2005 | Do ................................ 348/335 |
| 2005/0128597 A1 | 6/2005 | Amanai |
| 2006/0054782 A1 * | 3/2006 | Olsen et al. ................. 250/208.1 |
| 2006/0132644 A1 * | 6/2006 | Shangguan et al. .......... 348/374 |
| 2006/0209429 A1 | 9/2006 | Sato et al. |
| 2006/0238898 A1 | 10/2006 | Shinohara |
| 2007/0008625 A1 | 1/2007 | Park et al. |
| 2007/0010122 A1 | 1/2007 | Wang |
| 2007/0070518 A1 | 3/2007 | Muratani et al. |
| 2007/0127141 A1 | 6/2007 | Saito |
| 2007/0127142 A1 | 6/2007 | Saito |
| 2007/0133108 A1 | 6/2007 | Saito |
| 2007/0195432 A1 | 8/2007 | Nakamura |
| 2007/0229986 A1 | 10/2007 | Sato et al. |
| 2008/0043346 A1 | 2/2008 | Sano |
| 2008/0080028 A1 | 4/2008 | Bakin et al. |
| 2008/0100926 A1 | 5/2008 | Chen et al. |
| 2008/0174879 A1 | 7/2008 | Chen |
| 2008/0180816 A1 | 7/2008 | Nakamura |
| 2008/0239138 A1 | 10/2008 | Sano |
| 2008/0266679 A1 | 10/2008 | Nio |
| 2008/0303919 A1 | 12/2008 | Egawa |
| 2009/0009889 A1 | 1/2009 | Teraoka |
| 2009/0015944 A1 | 1/2009 | Taniyama |
| 2009/0052018 A1 | 2/2009 | Baker |
| 2009/0059392 A1 | 3/2009 | Sano |
| 2009/0067040 A1 * | 3/2009 | Izumi ............................ 359/356 |
| 2009/0086017 A1 | 4/2009 | Miyano |
| 2009/0201593 A1 | 8/2009 | Isono |
| 2009/0257133 A1 | 10/2009 | Sano |
| 2009/0290234 A1 | 11/2009 | Sano |
| 2010/0046096 A1 | 2/2010 | Hirao et al. |
| 2010/0091387 A1 | 4/2010 | Hirao et al. |
| 2010/0097711 A1 | 4/2010 | Saito |
| 2010/0103533 A1 | 4/2010 | Taniyama |
| 2010/0134903 A1 | 6/2010 | Hirao et al. |
| 2010/0134905 A1 | 6/2010 | Hirao et al. |
| 2010/0166413 A1 | 7/2010 | Hirao et al. |
| 2010/0181691 A1 | 7/2010 | Yoshida |
| 2010/0188555 A1 | 7/2010 | Hirao et al. |
| 2010/0321794 A1 | 12/2010 | Hirao et al. |
| 2011/0001865 A1 | 1/2011 | Hirao et al. |
| 2011/0007195 A1 | 1/2011 | Fukutu |
| 2011/0032410 A1 | 2/2011 | Shigemitsu et al. |
| 2011/0061799 A1 | 3/2011 | Wang |
| 2011/0115965 A1 | 5/2011 | Engelhardt et al. |
| 2011/0205641 A1 | 8/2011 | Shih |
| 2011/0255177 A1 | 10/2011 | Suzuki et al. |
| 2011/0267709 A1 | 11/2011 | Hirao et al. |
| 2011/0310495 A1 | 12/2011 | You |
| 2012/0314122 A1 * | 12/2012 | Yamashita .................... 348/360 |

FOREIGN PATENT DOCUMENTS

| | | |
|---|---|---|
| CN | 1892279 A | 1/2007 |
| CN | 2890966 Y | 4/2007 |
| CN | 101266329 A | 9/2008 |
| CN | 101414045 A | 4/2009 |
| CN | 201273959 Y | 7/2009 |
| EP | 1 600 803 A1 | 11/2005 |
| JP | 59-022009 | 2/1984 |
| JP | 59022009 A2 | 2/1984 |
| JP | 61-057918 | 3/1986 |
| JP | 61057918 A2 | 3/1986 |
| JP | 4-191716 | 7/1992 |
| JP | 7-5358 | 1/1995 |
| JP | 08-334684 | 12/1996 |
| JP | 9-284617 | 10/1997 |
| JP | 10-104491 | 4/1998 |
| JP | 10-170809 | 6/1998 |
| JP | 2001-221904 | 8/2001 |
| JP | 2002-98885 | 4/2002 |
| JP | 2002-296496 | 10/2002 |
| JP | 2003-029115 | 1/2003 |
| JP | 2003-57538 | 2/2003 |
| JP | 2003-270526 A | 9/2003 |
| JP | 2003-329922 A | 11/2003 |
| JP | 2004-004620 | 1/2004 |
| JP | 2004-064460 | 2/2004 |
| JP | 2004-88713 A | 3/2004 |
| JP | 2004-145183 | 5/2004 |
| JP | 2004-226487 A | 8/2004 |
| JP | 2004-246168 | 9/2004 |
| JP | 2004-246168 A | 9/2004 |
| JP | 2004-246169 | 9/2004 |
| JP | 2004-246169 A | 9/2004 |
| JP | 2004-252067 | 9/2004 |
| JP | 2004-254259 | 9/2004 |
| JP | 2004-301938 | 10/2004 |
| JP | 2005-018306 | 1/2005 |
| JP | 2005-24581 A | 1/2005 |
| JP | 2005-24889 A | 1/2005 |
| JP | 2005-107254 | 4/2005 |
| JP | 2005-107368 | 4/2005 |
| JP | 2005-107369 | 4/2005 |
| JP | 2005-157154 | 6/2005 |
| JP | 2005-286536 | 10/2005 |
| JP | 2006-178026 | 7/2006 |
| JP | 2006-293324 A | 10/2006 |
| JP | 2006-317916 A | 11/2006 |
| JP | 2007-065374 A | 3/2007 |
| JP | 2007-93972 | 4/2007 |
| JP | 2007-155821 A | 6/2007 |
| JP | 2007-156030 A | 6/2007 |
| JP | 2007-156031 A | 6/2007 |
| JP | 2007-212878 A | 8/2007 |
| JP | 2007-293176 A | 11/2007 |
| JP | 2008-33376 A | 2/2008 |
| JP | 2008-46526 A | 2/2008 |
| JP | 2008-76594 A | 4/2008 |
| JP | 2008-107616 A | 5/2008 |
| JP | 2008-185880 A | 8/2008 |
| JP | 2008-242180 A | 10/2008 |
| JP | 2008-281873 A | 11/2008 |
| JP | 2008-309999 | 12/2008 |
| JP | 2009-14899 A | 1/2009 |
| JP | 2009-018578 | 1/2009 |
| JP | 2009-20182 A | 1/2009 |
| JP | 2009-023353 | 2/2009 |
| JP | 2009-47836 A | 3/2009 |
| JP | 2009-53592 A | 3/2009 |
| JP | 2009-80413 A | 4/2009 |
| JP | 2009-98492 A | 5/2009 |
| JP | 2000-151113 A | 7/2009 |
| JP | 2009-157402 A | 7/2009 |
| JP | 2009-251515 A | 10/2009 |
| JP | 2009-251516 A | 10/2009 |
| JP | 2009-258286 A | 11/2009 |

| | | |
|---|---|---|
| JP | 2009-282223 A | 12/2009 |
| JP | 2010-72032 A | 4/2010 |
| JP | 2010-101942 | 5/2010 |
| JP | 2010-102182 A | 5/2010 |
| JP | 2010-151935 | 7/2010 |
| JP | 2011-107631 A | 6/2011 |
| TW | 200703636 A | 1/2007 |
| WO | 2009/025275 A1 | 2/2009 |
| WO | 2009/116492 A1 | 9/2009 |

OTHER PUBLICATIONS

U.S. Office Action mailed Aug. 8, 2012 in U.S. Appl. No. 13/053,943.
Office Action mailed Oct. 2, 2012 in U.S. Appl. No. 12/849,257.
U.S. Office Action mailed Sep. 7, 2012 in U.S. Appl. No. 12/833,313.
Office Action mailed Apr. 26, 2012 in U.S. Appl. No. 12/833,313.
Office Action mailed Apr. 12, 2013 in U.S. Appl. No. 13/159,755.
U.S. Appl. No. 13/053,943, filed Mar. 22, 2011, entitled "Image Sensing Lens and Image Sensing Module".
U.S. Appl. No. 12/833,313, filed Jul. 9, 2010, Shigemitsu et al.
U.S. Appl. No. 12/849,257, filed Aug. 3, 2010, Shigemitsu et al.
U.S. Appl. No. 13/005,877, filed Jan. 13, 2011 entitled "Image Pickup Lens, Image Pickup Module, and Portable Information Device", filed Jan. 13, 2011, inventor Shigemitsu et al. (not yet published).
U.S. Appl. No. 13/159,755, filed Jun. 14, 2011, entitled Lens Element, Imaging Lens, and Imaging Module.
U.S. Appl. No. 12/887,639, filed Sep. 22, 2010, entitled "Image Pickup Lens, Image Pickup Module, Method for Manufacturing Image Pickup Lens, and Method for Manufacturing Image Pickup Module".

* cited by examiner

FIG. 2
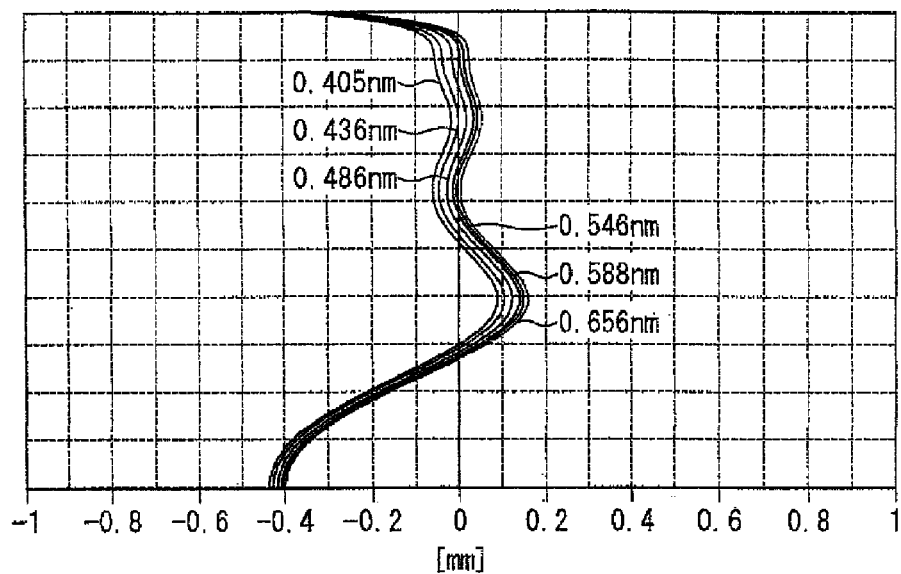
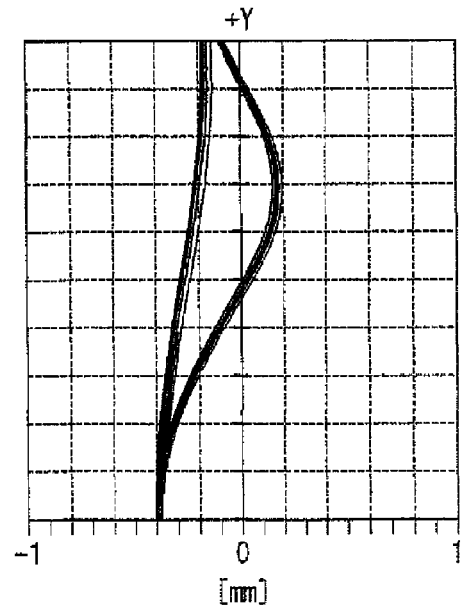 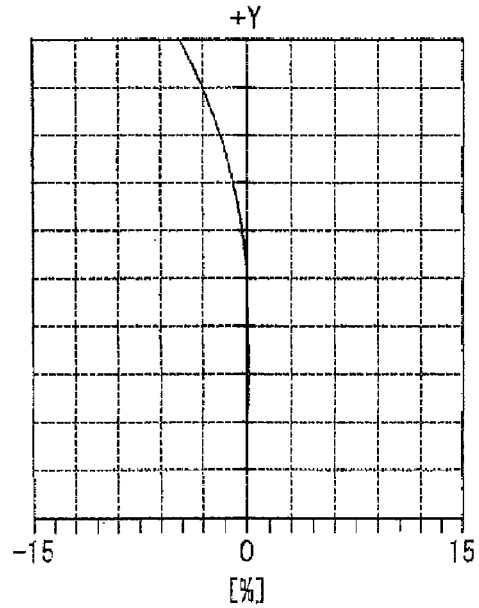

FIG. 6
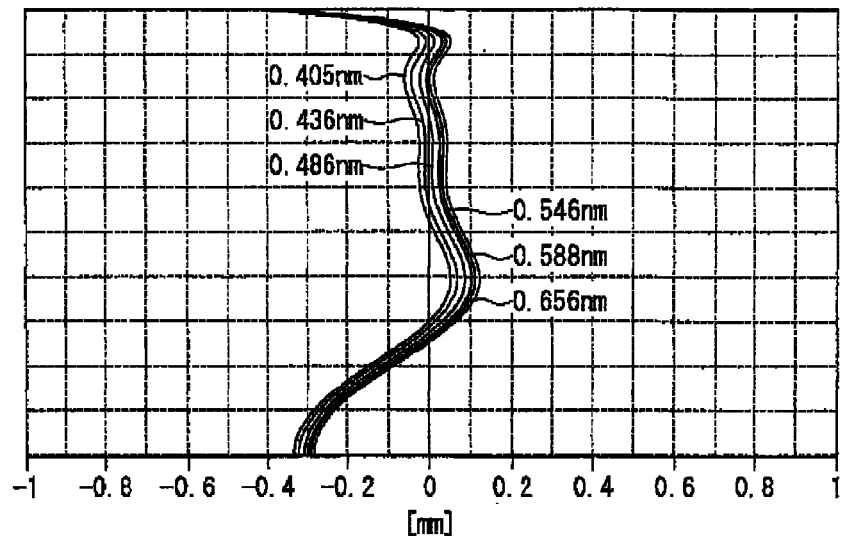
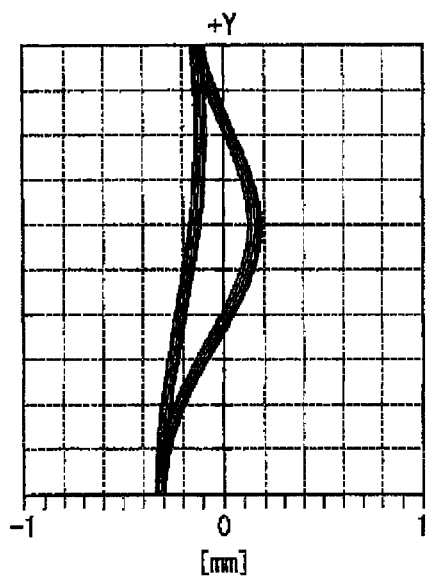
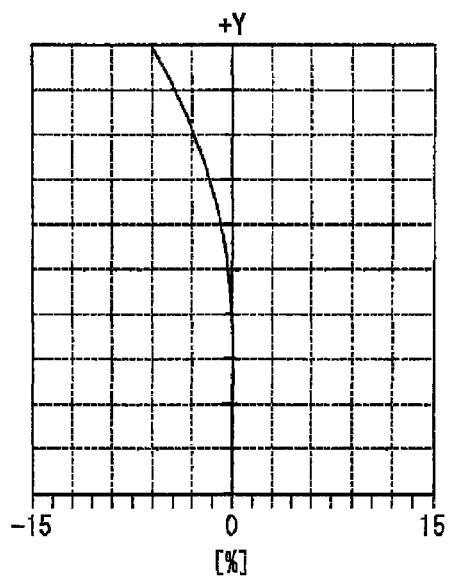

FIG. 11

|  | Nd | $\nu$d |
|---|---|---|
| THERMOPLASTIC RESIN | 1.53 | 58 |
| | 1.54 | 56 |
| | 1.509 | 56 |
| | 1.525 | 56 |
| | 1.531 | 56 |
| | 1.607 | 27 |
| | 1.632 | 23 |
| | 1.6142 | 26 |
| | 1.586 | 34 |
| | 1.515 | 57 |
| | 1.584 | 30.49 |
| THERMOSETTING RESIN | 1.498 | 46 |
| | 1.502 | 47 |
| | 1.508 | 42 |
| | 1.457 | 48 |
| | 1.49 | 39 |
| | 1.503 | 53 |

IMAGE PICKUP LENS COMPRISING APERTURE STOP AND SINGLE LENS, IMAGE PICKUP MODULE COMPRISING IMAGE PICKUP LENS INCLUDING APERTURE STOP AND SINGLE LENS, METHOD FOR MANUFACTURING IMAGE PICKUP LENS COMPRISING APERTURE STOP AND SINGLE LENS, AND METHOD FOR MANUFACTURING IMAGE PICKUP MODULE COMPRISING IMAGE PICKUP LENS INCLUDING APERTURE STOP AND SINGLE LENS

This Nonprovisional application claims priority under 35 U.S.C. §119(a) on Patent Application No. 2009-234347 filed in Japan on Oct. 8, 2009, the entire contents of which are hereby incorporated by reference.

TECHNICAL FIELD

The present invention relates to: an image pickup lens and an image pickup module that are to be provided in a portable terminal; a method for manufacturing an image pickup lens; and a method for manufacturing an image pickup module.

BACKGROUND ART

As image pickup modules, various types of compact digital cameras, compact digital video units, and the like have been developed each of which houses a solid-state image sensing device such as a CCD (Charge Coupled Device) and a CMOS (Complementary Metal Oxide Semiconductor). In particular, portable terminals such as portable information terminals and portable phones have spread in recent years. Accordingly, image pickup modules to be provided in the portable terminals are required to be small in size, low in height and high in resolving power.

A technique for increasing a resolving power of an image pickup lens to be provided in such an image pickup module, and reducing a size and a height of the image pickup lens attracts attention, as a technique for satisfying such requirements. As one example of such a technique, Patent Literatures 1 through 4 disclose respective image pickup lenses having the following arrangements.

Each of the image pickup lenses disclosed in Patent Literatures 1 through 4 has an aperture stop and a single lens which are provided in this order from an object (subject) side to an image surface (image forming surface) side. The single lens is one well-known meniscus lens whose concave surface faces the object side.

Such image pickup lenses are required to have a wide angle at which an image can be formed, i.e., a wide angle of view, in order that a high resolving power may be realized at an edge of a formed image and in the vicinity thereof (hereinafter, referred to as "a periphery of a formed image"). In order to realize an image pickup lens having a wide angle of view, it is effective to arrange the image pickup lens so that its single lens may be sufficiently thin, with respect to a center thickness thereof, at an end (hereinafter, referred to as "lateral side of the single lens") of the effective aperture of the single lens which end is located along a direction normal to an optical axis of the image pickup lens.

The image pickup lens disclosed in Patent Literature 4 is arranged so as to satisfy the following formula (A). This makes it possible to reduce a thickness of a lateral side of its single lens with respect to a center thickness of the single lens.

$$0.5 \leq d1'/d1 \leq 0.9 \quad (A)$$

where: $d1'$ is a thickness of that thinnest portion of the single lens which is located in an area including at least one optical surface of the single lens; and $d1$ is a center thickness of the single lens.

In addition, the image pickup lens disclosed in Patent Literature 4 is arranged so as to satisfy the following formula (B). This makes it possible to realize an image pickup lens having a wide angle of view.

$$0.6 \leq Y'/fl \quad (B)$$

where: $fl$ is a focal length of the whole lens system; and $Y'$ is the maximum image height.

CITATION LIST

Patent Literature 1
Japanese Patent Application Publication, Tokukaihei, No. 4-191716 A (Publication Date: Jul. 10, 1992)
Patent Literature 2
Japanese Patent Application Publication, Tokukai, No. 2001-221904 A (Publication Date: Aug. 17, 2001)
Patent Literature 3
Japanese Patent Application Publication, Tokukai, No. 2002-98885 A (Publication Date: Apr. 5, 2002)
Patent Literature 4
Japanese Patent Application Publication, Tokukai, No. 2003-57538 A (Publication Date: Feb. 26, 2003)
Patent Literature 5
Japanese Patent Application Publication, Tokukai, No. 2009-018578 A (Publication Date: Jan. 29, 2009)
Patent Literature 6
Japanese Patent Application Publication, Tokukai, No. 2009-023353 A (Publication Date: Feb. 5, 2009)

SUMMARY OF INVENTION

Technical Problem

The image pickup lens disclosed in Patent Literature 4 has an extremely short distance between the single lens and the image surface, with respect to the whole optical length (total of dimensions, along the optical axis, of all components each having a certain influence on an optical characteristic). This makes it difficult to converge, to a desired point on the image surface by the single lens, light from the edge of an object and its surrounding (hereinafter, referred to as "periphery of an object"), even if all the formulas, including the formulas (A) and (B), disclosed in Patent Literature 4 are satisfied. Accordingly, the image pickup lens still bears a difficulty in obtaining a desired wide angle of view. This results in a difficulty in realizing a higher resolution of the periphery of a formed image (i.e., the periphery is blurred).

The present invention was made in view of the problem. An object of the present invention is to provide an image pickup lens, an image pickup module, a method for manufacturing an image pickup lens, and a method for manufacturing an image pickup module each of which makes it possible to realize a much higher resolution of a periphery of a formed image.

Solution to Problem

In order to attain the object, an image pickup lens of the present invention includes: an aperture stop; and single lens, the aperture stop and the single lens being arranged in this order along a direction from an object to an image surface, the single lens being a meniscus lens having a concave surface facing the object, said image pickup lens satisfying formulas (1) and (2):

$$0.080 < d1/d2 < 0.22 \quad (1);$$

and $$d1'/d1 < 1.00 \quad (2)$$

where: d1 is a center thickness of the single lens; d1' is a thickness of a lateral side of the single lens; and d2 is a length in air between the image surface and a center of that surface of the single lens which faces the image surface.

The term "length in air" means a length obtained by dividing the geometric length of a medium by the refractive index of the medium.

According to the arrangement, the image pickup lens satisfies the formula (1) so as to sufficiently increase, with respect to the whole optical length, d2 which is a substantial clearance between the single lens and the image surface. This allows the single lens to surely converge, to a desired point on the image surface, light from the periphery of the object. The image pickup lens thus makes it possible to easily obtain a desired wide angle of view. This makes it possible to easily realize a higher resolution of the periphery of a formed image.

According to the arrangement, further, the image pickup lens satisfies the formula (2) so as to reduce, with respect to d1 which is the center thickness of the single lens, d1' which is a thickness of the lateral side of the single lens. This makes it possible to realize a wide angle of view. The image pickup lens thus makes it possible to easily realize a much higher resolution of the periphery of a formed image.

Hence, the image pickup lens makes it possible to realize a much higher resolution of the periphery of a formed image.

Further, an image pickup module of the present invention includes: the image pickup lens of the present invention; and a solid-state image sensing device provided on the image surface of the image pickup lens.

The arrangement makes it possible to realize an image pickup module which produces the same effect as the image pickup lens.

A method of the present invention for manufacturing an image pickup lens is a method for manufacturing the image pickup lens of the present invention, including the steps of: molding a molding material into a lens array, the lens array having portions each molded as the single lens; and dividing the lens array into separate image pickup lenses.

A method of the present invention for manufacturing an image pickup module is a method for manufacturing the image pickup module of the present invention, including the steps of: molding a molding material into a lens array, the lens array having portions each molded as the single lens; and dividing the lens array into separate image pickup modules.

According to the methods, the molding material is molded into the lens array having portions as the plurality of single lenses. Then, the lens array is divided for individual image pickup lenses or individual image pickup modules. That is, the methods correspond to a wafer-level lens process for manufacturing the image pickup lens and to that for manufacturing the image pickup module, respectively. Thus, the methods are those which make it possible to reduce manufacturing costs especially in mass-production.

Advantageous Effects of Invention

As described above, the image pickup lens of the present invention includes: an aperture stop; and a single lens, the aperture stop and the single lens being arranged in this order along a direction from an object to an image surface, the single lens being a meniscus lens having a concave surface facing the object, said image pickup lens satisfying the formulas (1) and (2) where: d1 is a center thickness of the single lens; d1' is a thickness of a lateral side of the single lens; and d2 is a length in air between the image surface and a center of that surface of the single lens which faces the image surface.

Hence, the present invention makes it possible to realize a much higher resolution of the periphery of a formed image.

BRIEF DESCRIPTION OF DRAWINGS

FIG. 2(a) through (c) of FIG. 2 are graphs showing characteristic of various aberrations of the image pickup lens of FIG. 1, wherein (a) shows a characteristic of a spherical aberration, (b) shows a characteristic of astigmatism, and (c) shows a characteristic of a distortion.

FIG. 6(a) through (e) of FIG. 6 are graphs showing characteristic of various aberrations of the image pickup lens of FIG. 5, wherein (a) shows a characteristic of a spherical aberration, (b) shows a characteristic of astigmatism, and (c) shows a characteristic of a distortion.

FIG. 11 is a table which shows, for each of thermoplastic resin and thermosetting resin, relationships between refractive indexes and Abbe numbers of an image pickup lens as a whole on d-rays.

DESCRIPTION OF EMBODIMENTS

Figure 1:
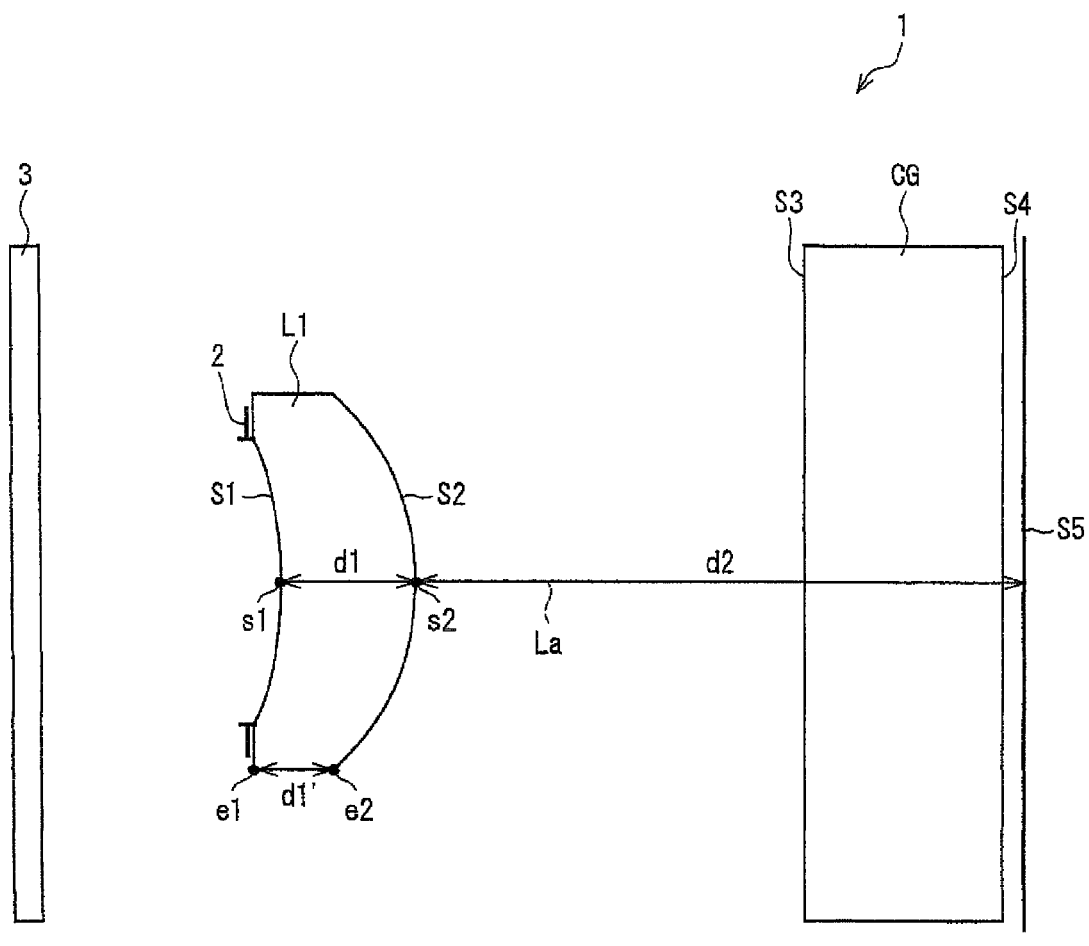
FIG. 1 is cross-sectional view illustrating an arrangement of an image pickup lens of one embodiment of the present invention.

FIG. 1 is a cross-sectional view illustrating an arrangement of an image pickup lens of one embodiment of the present invention.

Figure 3:
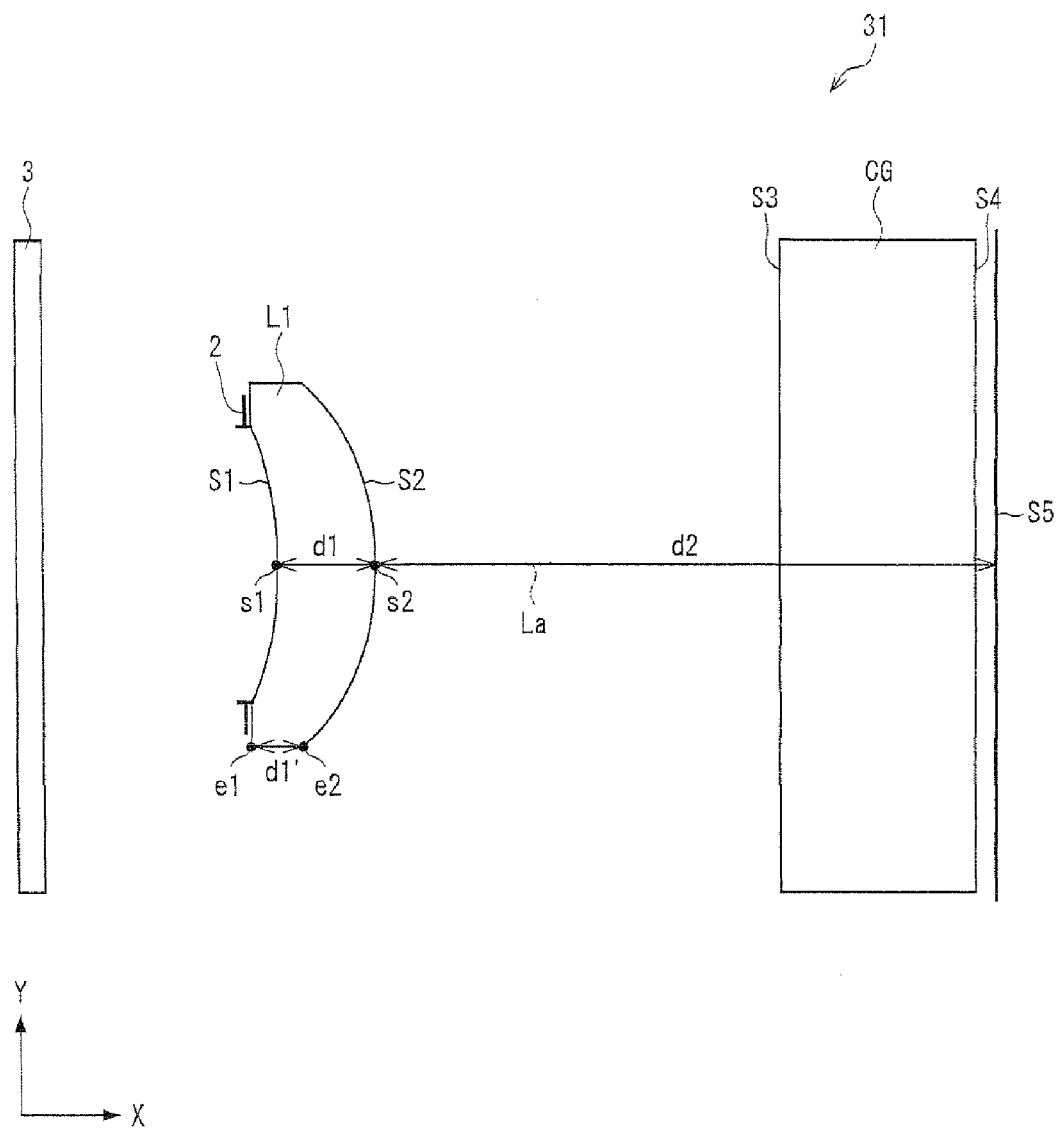
FIG. 3 is a cross-sectional view illustrating an arrangement of an image pickup lens of another embodiment of the present invention.

FIG. 3 is a cross-sectional view illustrating an arrangement of an image pickup lens of another embodiment of the present invention.

Figure 5:
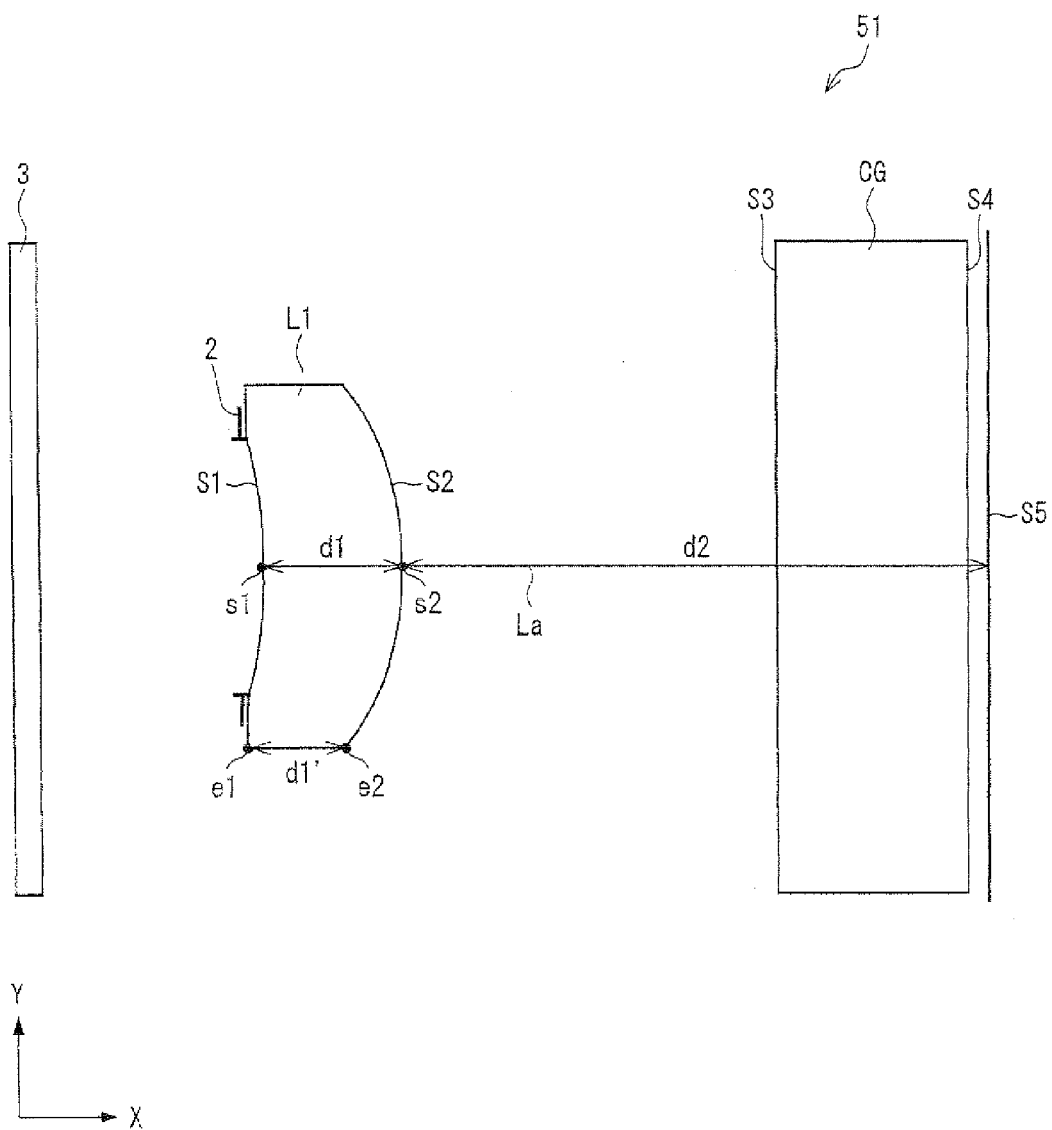
FIG. 5 is a cross-sectional view illustrating an arrangement of an image pickup lens of still another embodiment of the present invention.

FIG. 5 is a cross-sectional view illustrating an arrangement of an image pickup lens of still another embodiment of the present invention.

In explanations of common technical matters among an image pickup lens 1 of FIG. 1, an image pickup lens 31 of FIG. 3, and an image pickup lens 51 of FIG. 5, the image pickup lenses 1, 31, and 51 are collectively referred to as "image pickup lenses of the present invention," for convenience of explanation.

Specifically, FIGS. 1, 3, and 5 are views illustrating those cross-sections of the image pickup lenses of the present invention each of which is parallel with an X direction (horizontal direction in the figures) and a Y direction (vertical direction in the figures). The X direction is a direction from an object 3 side toward an image surface S5 side. An optical axis La of each of the image pickup lenses of the present invention is substantially parallel with the X direction. The Y direction is a direction perpendicular to the X direction. A normal direction with respect to the optical axis La is substantially parallel with the Y direction.

Each of the image pickup lenses of the present invention includes an aperture stop 2, a single lens L1, and a cover glass (image surface protective glass) CG in this order from the object 3 side toward the image surface S5 side.

Specifically, the aperture stop 2 is provided so as to enclose a periphery of a surface S1 of the single lens L1 which surface S1 faces the object 3 side (i.e., periphery of an object-side surface of the single lens L1). In order that light incident upon each of the image pickup lenses of the present invention may properly pass through the single lens L1, the aperture stop 2 serves to limit a diameter of an axial bundle of the light.

The object 3 is a target whose image is formed by each of the image pickup lenses of the present invention. In other words, the object 3 is a subject of each of the image pickup lenses of the present invention.

The single lens L1 is a well-known meniscus lens whose surface S1 facing the object 3 is a concave surface. On the other hand, the single lens L1 has a convex surface facing the image surface S5. A surface S2 of the single lens L1 which surface S2 faces the image surface S5 (i.e., image-side surface of the single lens L1) is an aspheric surface.

The term "convex surface of a lens" refers to that spherical surface of the lens which curves outward. The term "concave surface of a lens" refers to that surface of the lens which curves so as to form a hollow, i.e., refers to that surface of the lens which curves inward.

The cover glass CO is interposed between the single lens L1 and the image surface S5. The cover glass CG covers the image surface S5 in order to protect the image surface S5 from physical damage etc. The cover glass CG has a surface (object-side surface) S3 facing the object 3 and a surface (image-side surface) S4 facing the image surface S5.

The image surface S5 is a surface which is perpendicular to each of the optical axes La of the image pickup lenses of the present invention and on which an image is formed. A real image can be observed on a screen (not illustrated) placed on the image surface S5. In an image pickup module having any one of the image pickup lenses of the present invention, an image pickup device is provided to the image surface S5.

A distance d1 is a distance from a center s1 of the surface S1 to a center s2 of the surface S2. The distance d1 is equal to a center thickness of the single lens L1.

A distance d2 is a distance (in air) between the center s2 of the surface S2 and the image surface S5. The distance d2 is equal to a length in air between the image surface S5 and the center s2 of that surface S2 of the single lens L1 which faces the image surface S5. The term "length in air" means a length obtained by dividing the geometric length of a medium by the refractive index of the medium.

A distance d1' is a distance between an edge e1 which is an end of an effective aperture of the surface S1 and an edge e2 which is an end of an effective aperture of the surface S2. The distance d1' is equal to a thickness of lateral sides of the single lens L1.

Needless to say, the image pickup lens of the present invention is actually a three-dimensional object. Accordingly, the edge e1 corresponds to an entire edge (e.g., circumference) of the effective aperture of the surface S1. Similarly, the edge e2 corresponds to an entire edge (e.g., circumference) of the effective aperture of the surface S2. In this case, the distance d1' is understood to be a distance between the edges e1 and e2 of the thinnest portion in an area including at least a part of one optical surface of the single lens L1.

Each of the distances d1, d2, and d1' is a distance along the X direction which distance is expressed in the unit mm (millimeter).

The image pickup lens of the present invention is arranged so as to satisfy the following formulas (1) and (2):

$$0.080 < d1/d2 < 0.22 \quad (1);$$

and $$d1'/d1 < 1.00$$

The image pickup lens of the present invention satisfies the formula (1) so as to increase, with respect to the whole optical length, the distance d2 which is a substantial clearance between the single lens L1 and the image surface S5. This allows the single lens L1 to surely converge, to a desired point on the image surface S5, light from the peripheral part of the object 3. The image pickup lens of the present invention thus makes it possible to easily obtain a desired wide angle of view. This makes it possible to easily realize a higher resolution of a periphery of a formed image.

The image pickup lens of the present invention satisfies the formula (2) so as to reduce the distance d1 with respect to the distance d1. This makes it possible to reduce a thickness of the lateral sides of the single lens L1 with respect to a center thickness thereof. This makes it possible to realize a wide angle of view. Thus, the image pickup lens makes it possible to easily realize a much higher resolution of a periphery of a formed image.

Hence, the image pickup lens of the present invention makes it possible to realize a much higher resolution of a periphery of a formed image.

In a case where a value of "d1/d2" in the formula (1) is not more than 0.080, a too small thickness of the single lens L1 due to a lowered height of the image pickup lens can cause a difficulty in molding the single lens L1. In a case where a value of "d1/d2" is not less than 0.22, there arises a difficulty in realizing a higher resolution of a periphery of a formed image, as is the case with the image pickup lens disclosed in Patent Literature 4.

In a case where a value of "d1'/d1" in the formula (2) is not less than 1.00, the single lens L1 has a larger thickness at its lateral sides. This is not preferable from a viewpoint of realization of an image pickup lens having a wide angle of view. Accordingly, this can adversely affect on the realization of a higher resolution of a periphery of a formed image.

In view of this, the image pickup lens of the present invention is arranged so as to satisfy the formulas (1) and (2).

As for the image pickup lens disclosed in Patent Literature 4, the single lens has a large center thickness of approximately 0.90 mm. Accordingly, the whole optical length is long. This leads to a problem of an insufficiently small size of the image pickup lens even if formulas shown in the Patent Literature 4, including the aforementioned formulas (A) and (B), are satisfied.

In view of this, the image pickup lens of the present invention is arranged so as to satisfy the following formula (3):

$$d1 < 0.28 \text{ mm} \quad (3)$$

The image pickup lens of the present invention further satisfies the formula (3) so that the single lens L1 may have a small center thickness. This allows the image pickup lens to have a much smaller size and a much lower height.

As described above, the image pickup lens satisfies the formula (1) so that a value of "d1/d2" may be more than 0.080. This allows the image pickup lens to prevent the distance d1' from being extremely small due to its lowered height when the formula (2) is satisfied. As a result, molding the single lens L1 is not very difficult. That is, the single lens L1 can be easily molded by well-known injection molding or well-known molding using a die. Thus, the image pickup lens of the present invention makes it possible to easily mold the single lens L1 and to reduce a size and a height of the image pickup lens.

Further, the image pickup lens satisfies the formula (3) so that the single lens L1 may have a large positive refracting power. This allows the single lens L1 to converge more surely, to a desired point on the image surface S5, light from the peripheral part of the object 3.

An Abbe number of the single lens L1 is preferably less than 50.

Abbe number refers to that constant of an optical medium which indicates a ratio of a refractive index of light to a dispersivity of the light. In other words, an Abbe number is a degree to which rays of light of varying wavelengths are refracted in different directions. The higher the Abbe number of an optical medium, the lower the dispersivity corresponding to a degree to which rays of light of varying wavelengths are refracted in different directions.

This makes it possible to use, as a material for the single lens L1, a material having a relatively low Abbe number. Accordingly, the number of materials which can be adopted as materials for the single lens L1 can be increased. This makes it possible to reduce a possibility that there arises a difficulty in adopting that material for the single lens L1 which is suitable for a wafer-level lens process. Thus, since the image pickup lens of the present invention can be manufactured by a wafer-level lens process, the image pickup lens is suitable for reduction in manufacturing costs and for mass-production. Details of the wafer-level lens process are described later.

The cover glass CG preferably has a thickness of more than 0.3 mm.

This makes it possible to relax a specification related to an allowable dust size and protect the image surface S5 from physical damage. Protection of the image surface S5 from physical damage is advantageous in carrying out a wafer-level lens process.

The image pickup lens of the present invention is preferably arranged to have an F number of less than 4. An F number of the image pickup lens is expressed as a value obtained by dividing an equivalent focal length of the image pickup lens by an incident pupil diameter of the image pickup lens. The image pickup lens thus arranged can increase brightness of an image to be formed.

A material for the single lens L1 is preferably a thermosetting resin or a UV curable resin. The thermosetting resin is a resin having such a property that the resin changes from a liquid to a solid when a heat of not less than a predetermined amount is applied to the resin. The UV curable resin is a resin having such a property that the resin changes from a liquid to a solid when being irradiated with ultraviolet rays of not less than a predetermined intensity.

In a case where the single lens L1 is made from the thermosetting resin or the UV curable resin, it is possible to mold the resin into a plurality of single lenses L1 in a manufacturing process of the image pickup lens so that a lens array 141 (to be described later; see (a) of FIG. 10) can be manufactured. Thus, since the image pickup lens of the present invention can be manufactured by a wafer-level lens process, the image pickup lens allows reduction in manufacturing costs and mass-production. This makes it possible to provide inexpensive image pickup lenses.

Further, in a case where the single lens L1 is made from the thermosetting resin or the UV curable resin, it is possible to subject the image pickup lens to reflowing. In other words, the image pickup lens which can be subjected to reflowing can be realized by adopting a heat-resistant material for the single lens L1.

Alternatively, the single lens L1 can be made from plastic or glass.

The following describes differences among the image pickup lens 1 of FIG. 1, the image pickup lens 31 of FIG. 3, and the image pickup lens 51 of FIG. 5.

Table 1 shows a concrete example of a formula for designing a lens system using the image pickup lens 1.

Table 2 shows a concrete example of a formula for designing a lens system using the image pickup lens 31.

Table 3 shows a concrete example of a formula for designing a lens system using the image pickup lens 51.

TABLE 1

| Element | | | | Curvature | Center thickness | Effective radius | Aspheric coefficient | | | |
|---|---|---|---|---|---|---|---|---|---|---|
| Member | Nd | vd | Surface | [mm$^{-1}$] | [mm] | [mm] | K | A4 | A6 | A8 |
| Stop | — | — | S0 | — | 0.036 | 0.161 | — | — | — | — |
| L1 | 1.498 | 45 | S1 | −1.36E+00 | 0.149 | 0.163 | 0.00E+00 | −7.69E+01 | 1.11E+04 | −8.26E+05 |
| | | | S2 | −3.36E+00 | 0.989 | 0.213 | 0.00E+00 | 5.65E+01 | −7.44E+03 | 4.62E+05 |

TABLE 1-continued

| Element | | | | Curvature | Center thickness | Effective radius | | | | |
|---|---|---|---|---|---|---|---|---|---|---|
| Member | Nd | vd | Surface | [mm⁻¹] | [mm] | [mm] | | | | |
| CG | 1.516 | 64 | S3 | — | 0.500 | — | — | — | — | — |
|  |  |  | S4 | — | 0.050 | — | — | — | — | — |
| Image Surface | — | — | S5 | — | 0.000 | 0.700 | — | — | — | — |

| Element | | | | Aspheric coefficient | | | |
|---|---|---|---|---|---|---|---|
| Member | Nd | vd | Surface | A10 | A12 | A14 | A16 |
| Stop | — | — | S0 | — | — | — | — |
| L1 | 1.498 | 45 | S1 | 1.84E+07 | 9.00E+08 | −5.57E+10 | 8.25E+11 |
|  |  |  | S2 | −1.49E+07 | 2.34E+08 | −1.33E+09 | −2.05E+09 |
| CG | 1.516 | 64 | S3 | — | — | — | — |
|  |  |  | S4 | — | — | — | — |
| Image Surface | — | — | S5 | — | — | — | — |

TABLE 2

| Element | | | | Curvature | Center thickness | Effective radius | Aspheric coefficient | | | |
|---|---|---|---|---|---|---|---|---|---|---|
| Member | Nd | vd | Surface | [mm⁻¹] | [mm] | [mm] | K | A4 | A6 | A8 |
| Stop | — | — | S0 | — | 0.051 | 0.193 | — | — | — | — |
| L1 | 1.531 | 56 | S1 | −1.41E+00 | 0.148 | 0.195 | 0.00E+00 | −4.45E+01 | 3.85E+03 | −1.59E+05 |
|  |  |  | S2 | −2.93E+00 | 1.342 | 0.247 | 0.00E+00 | 4.58E+01 | −6.04E+03 | 3.88E+05 |
| CG | 1.516 | 64 | S3 | — | 0.500 | — | — | — | — | — |
|  |  |  | S4 | — | 0.050 | — | — | — | — | — |
| Image Surface | — | — | S5 | — | 0.000 | 0.880 | — | — | — | — |

| Element | | | | Aspheric coefficient | | | |
|---|---|---|---|---|---|---|---|
| Member | Nd | vd | Surface | A10 | A12 | A14 | A16 |
| Stop | — | — | S0 | — | — | — | — |
| L1 | 1.531 | 56 | S1 | −2.11E+05 | 2.19E+08 | −6.40E+09 | 5.88E+10 |
|  |  |  | S2 | −1.38E+07 | 2.73E+08 | −2.82E+09 | 1.18E+10 |
| CG | 1.516 | 64 | S3 | — | — | — | — |
|  |  |  | S4 | — | — | — | — |
| Image Surface | — | — | S5 | — | — | — | — |

TABLE 3

| Element | | | | Curvature | Center thickness | Effective radius | Aspheric coefficient | | | |
|---|---|---|---|---|---|---|---|---|---|---|
| Member | Nd | vd | Surface | [mm⁻¹] | [mm] | [mm] | K | A4 | A6 | A8 |
| Stop | — | — | S0 | — | 0.036 | 0.207 | — | — | — | — |
| L1 | 1.531 | 56 | S1 | −1.05E+00 | 0.266 | 0.210 | 0.00E+00 | −1.73E+01 | 1.63E+03 | −7.80E+04 |
|  |  |  | S2 | −2.24E+00 | 1.374 | 0.298 | 0.00E+00 | 1.34E+01 | −9.82E+02 | 3.76E+04 |
| CG | 1.516 | 64 | S3 | — | 0.500 | — | — | — | — | — |
|  |  |  | S4 | — | 0.050 | — | — | — | — | — |
| Image Surface | — | — | S5 | — | 0.000 | 0.880 | — | — | — | — |

| Element | | | | Aspheric coefficient | | | |
|---|---|---|---|---|---|---|---|
| Member | Nd | vd | Surface | A10 | A12 | A14 | A16 |
| Stop | — | — | S0 | — | — | — | — |
| L1 | 1.531 | 56 | S1 | 1.05E+06 | 3.75E+07 | −1.41E+09 | 1.30E+10 |
|  |  |  | S2 | −8.28E+05 | 1.04E+07 | −6.89E+07 | 1.87E+08 |
| CG | 1.516 | 64 | S3 | — | — | — | — |
|  |  |  | S4 | — | — | — | — |
| Image Surface | — | — | S5 | — | — | — | — |

In each of Tables 1 through 3, the refractive index Nd and the Abbe number vd of each member are those obtained in a case where d-rays (wavelength of 587.6 nm) are applied to respective materials. Center thickness refers to a distance between a center of a surface and a center of a corresponding surface toward the image surface along the optical axis La (see FIGS. 1, 3, and 5). Effective radius refers to a radius of a circular region (effective aperture) where a range of a light beam can be limited.

Aspheric coefficient refers to an aspheric coefficient Ai of i-th order (where i is an even number of not less than 4) in the following formula (4), which is an aspheric formula for an aspheric surface. In the formula (4), Z is a coordinate on the optical axis (X direction in FIGS. 1, 3, and 5), x is a coordinate on a line normal to the optical axis (Y direction in FIGS. 1, 3, and 5), R is a curvature radius (inverse of a curvature), and K is a conic coefficient.

[Formula 1]

$$Z = \frac{x^2 \times \frac{1}{R}}{1 + \sqrt{1 - (1+K) \times x^2 \times \frac{1}{R}}} + \sum_{i=4} A_i \times x^i \quad (4)$$

where i is an even number.

The description of values "(Constant a) E (Constant b)" in each of Tables 1 through 3 represents "(Constant a)×10 raised to the power of (Constant b)." For example, "8.25E+11" represents "$8.25 \times 10^{+11}$."

Table 4 shows a concrete example of specifications of each of the image pickup lenses 1, 31, and 51.

TABLE 4

| Data | | Image pickup lens 1 | Image pickup lens 31 | Image pickup lens 51 |
|---|---|---|---|---|
| Sensor | | 1/13 inch type, VGA | 1/10 inch type, VGA | 1/10 inch type, VGA |
| Sensor pixel pitch/μm | | 1.75 | 2.20 | 2.20 |
| Image circle radius/mm | | 1.40 | 1.76 | 1.76 |
| Material | Nd | 1.498 | 1.531 | 1.531 |
| | vd | 45 | 56 | 56 |
| F number | | 2.8 | 2.8 | 3.2 |
| Focal length/mm | | 0.900 | 1.082 | 1.326 |
| Angle of view/deg | D (Diagonal) | 61.9 | 61.9 | 62.1 |
| | H (Horizontal) | 50.0 | 50.0 | 50.0 |
| | V (Vertical) | 38.0 | 38.0 | 37.8 |
| TV distortion/% | | −1.82 | −1.80 | −2.23 |
| Relative illumination/% | h0.6 | 89.4 | 89.0 | 90.3 |
| | h0.8 | 82.4 | 81.5 | 83.8 |
| | h1.0 | 74.4 | 73.1 | 76.3 |
| CRA/deg | h0.6 | 15.3 | 15.5 | 14.6 |
| | h0.8 | 20.2 | 20.4 | 19.2 |
| | h1.0 | 24.7 | 25.0 | 23.6 |
| Whole optical length (incl. CG)/mm | | 1.72 | 2.09 | 2.23 |
| CG thickness/mm | | 0.5 | 0.5 | 0.5 |
| R1 (curvature radius of surface S1)/mm | | −0.734 | −0.707 | −0.956 |
| R2 (curvature radius of surface S2)/mm | | −0.298 | −0.341 | −0.446 |
| f (lens focal length)/mm | | 0.900 | 1.082 | 1.326 |
| d0 (distance between stop and S1)/mm | | 0.036 | 0.051 | 0.036 |
| d1 (lens center thickness)/mm | | 0.149 | 0.148 | 0.266 |
| d1′ (thinnest lens portion)/mm | | 0.093 | 0.084 | 0.185 |
| d1′/d1 | | 0.63 | 0.57 | 0.69 |

TABLE 4-continued

| Data | Image pickup lens 1 | Image pickup lens 31 | Image pickup lens 51 |
|---|---|---|---|
| Distance between S2 and CG/mm | 0.989 | 1.342 | 1.374 |
| d2 (distance between S2 and image surface)/mm (in air) | 1.369 | 1.722 | 1.754 |
| d1/d2 | 0.109 | 0.086 | 0.152 |
| d1/f | 0.165 | 0.137 | 0.201 |

In Table 4, a row with a heading of "Sensor" shows, for each image pickup lens of the present invention, specifications of a solid-state image sensing device which match specifications of the image pickup lens. Specifically, the specifications of the solid-state image sensing device for the image pickup lens 1 are a VGA (640×480 pixels) class, and a size of a 1/13 inch type. The specifications of the solid-state image sensing device for the image pickup lenses 31 and 51 are the VGA class, and a size of a 1/10 inch type.

An image pickup module of the present invention (to be described later in detail) is realized by combining any one of the image pickup lenses of the present invention with any one of the solid-state image sensing devices of the VGA class. The image pickup module makes it possible to realize an image pickup module having a good resolution capability. Further, the image pickup module makes it possible to reduce the number of lenses. This makes it possible to reduce factors which can cause a manufacturing tolerance. This makes the manufacture easy.

In Table 4, a row with a heading of "Sensor pixel pitch" shows those pixel pitches of the solid-state image sensing devices which match the specifications of the image pickup lenses of the present invention. As Table 4 shows, a sensor pixel pitch is preferably less than 2.5 μm. Adopting such a sensor (solid-state image sensing device) makes it possible to realize an image pickup module which makes full use of the performance capabilities of the image pickup device having a large number of pixels.

In Table 4, a row with a heading of "The image circle radius" shows effective image circle sizes (radiuses) of images resolved by the image pickup lenses of the present invention.

Rows with a heading of "Material" show, for each image pickup lens, a refractive index Nd and an Abbe number vd of its single lens L1 which are obtained in a case where d-rays (wavelength of 587.6 nm) are applied thereto.

Rows with a heading of "Angle of view" show, with the three-dimensional parameters: D (Diagonal), H (Horizontal), and V (Vertical), angles of view of the image pickup lenses of the present invention, i.e., angles at which the image pickup lenses of the present invention can form images.

Rows with a heading of "Relative illumination" show, for each of the image heights: h 0.6, h 0.8, and h 1.0, relative illuminations (ratio of an amount of light to an amount of light at an image height of h 0) of the image pickup lenses of the present invention.

The term "image height" means the height of an image with reference to the center of the image. Moreover, the height of an image with respect to the maximum image height is expressed as a percentage. The image height is expressed as an image height h of 0.8 as above (or else may be sometimes expressed as eight-in-ten image height, h 8.0, etc.) to indicate a place at an image height corresponding to 80% of the maximum image height with reference to the center of the image. The image heights: h 0, h 0.6; and h 1.0 are expressions of the same kind as h 0.8.

In Table 4, rows with a heading of "CRA" show, for each of the image heights: h 0.6, h 0.8, and h 1.0, chief ray angles (CRA) of the image pickup lenses of the present invention.

A row with a heading of "Whole optical length" shows, for each image pickup lens of the present invention, a distance between the image surface S5 and a position where the aperture stop 2 narrows down a light beam. In other words, the whole optical length of each of the image pickup lenses of the present invention is the total of dimensions, along the optical axis, of all components each having a certain influence on an optical characteristic.

Plainly speaking, the image pickup lens 1 of FIG. 1, the image pickup lens 31 of FIG. 3, and the image pickup lens 51 of FIG. 5 are structurally different from each other as below.

In the image pickup lens 1, a thermosetting resin material is adopted as a material of the single lens L1. As described above, the specifications of the solid-state image sensing device which match the specifications of the image pickup lens 1 are the VGA class and the size of the 1/13 inch type.

In the image pickup lens 31, a thermoplastic resin material is adopted as a material of the single lens L1. As described above, the specifications of the solid-state image sensing device which match the specifications of the image pickup lens 31 are the VGA class and the size of the 1/10 inch type. A center thickness of the single lens L1 (i.e., distance d1 of FIG. 3) is 0.148 mm. A thickness of the lateral sides of the single lens L1 (i.e., distance d1' of FIG. 3) is 0.084 mm. In the image pickup lens 31, the single lens L1 is relatively thin.

In the image pickup lens 51, a thermoplastic resin material is adopted as a material of the single lens L1. As described above, the specifications of the solid-state image sensing device which match the specifications of the image pickup lens 51 are the VGA class and the size of the 1/10 inch type. A center thickness of the single lens L1 (i.e., distance d1 of FIG. 5) is 0.266 mm. A thickness of the lateral sides of the single lens L1 (i.e., distance d1' of FIG. 5) is 0.185 mm. In the image pickup lens 51, the single lens L1 has a greater thickness than in the image pickup lens 31.

According to Table 4, as for a value of "d1/d2," the image pickup lens 1 shows approximately 0.109 which is found by the equation: approximately 0.149 mm (distance d1)/approximately 1.369 mm (distance d2); the image pickup lens 31 shows approximately 0.086 which is found by the equation: approximately 0.148 mm (distance d1)/approximately 1.722 mm (distance d2); and the image pickup lens 51 shows approximately 0.152 which is found by the equation: approximately 0.266 mm (distance d1)/approximately 1.754 mm (distance d2). This shows that each of the image pickup lenses of the present invention satisfies the formula (1).

According to Table 4, as for a value of "d1'/d1," the image pickup lens 1 shows approximately 0.63 which is found by the equation: approximately 0.093 mm (distance d1')/approximately 0.149 mm; the image pickup lens 31 shows approximately 0.57 which is found by the equation: approximately 0.084 mm (distance/approximately 0.148 mm; and the image pickup lens 51 shows approximately 0.69 which is found by the equation: approximately 0.185 mm (distance d1')/approximately 0.266 mm. This shows that each of the image pickup lenses of the present invention satisfies the formula (2).

Further, according to Table 4, each of the image pickup lenses 1, 31, and 51 has a distance d1 of less than 0.28 mm. This shows that each of the image pickup lenses of the present invention satisfies the formula (3).

According to Table 4, the single lens L1 of the image pickup lens 1 has an Abbe number of 45 which is less than 50.

According to Table 4, each of the cover glasses CG of the image pickup lenses of the present invention has a thickness of 0.5 mm which is more than 0.3 mm.

According to Table 4, the image pickup lenses 1 and 31 both have an F number of 2.8. On the other hand, the image pickup lens 51 has an F number of 3.2. That is, each of the image pickup lenses of the present invention has an F number of less than 4.

(a) to (c) of FIG. 2 are graphs showing characteristics of various aberrations of the image pickup lens 1. (a) of FIG. 2 shows a characteristic of a spherical aberration. (b) of FIG. 2 shows a characteristic of astigmatism. (c) of FIG. 2 shows a characteristic of a distortion.

Figure 4:
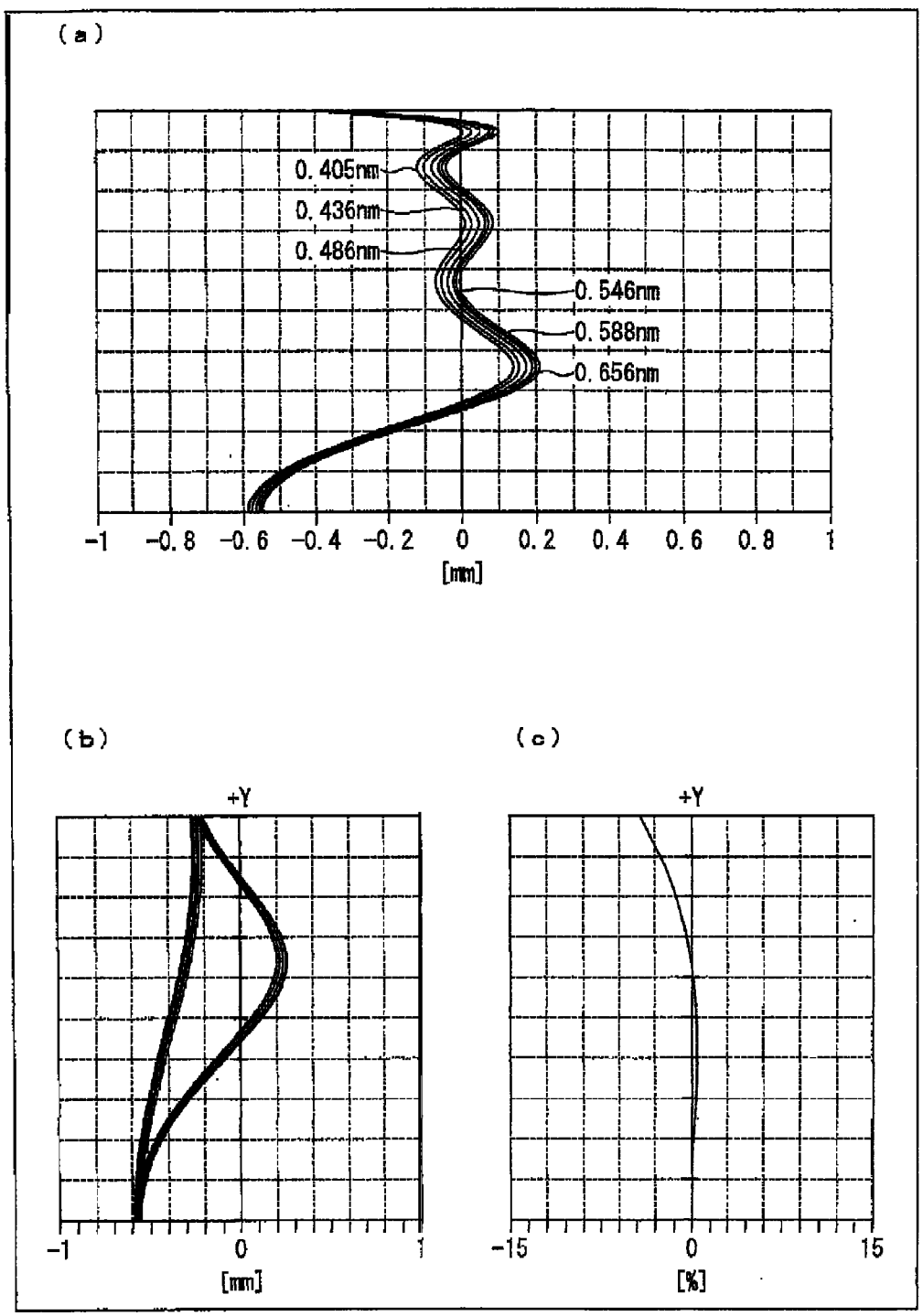
FIG. 4 (a) through (c) of FIG. 4 are graphs showing characteristic of various aberrations of the image pickup lens of FIG. 3, wherein (a) shows a characteristic of a spherical aberration, (b) shows a characteristic of astigmatism, and (c) shows a characteristic of a distortion.

(a) to (c) of FIG. 4 are graphs showing characteristics of various aberrations of the image pickup lens 31. (a) of FIG. 4 shows a characteristic of a spherical aberration. (b) of FIG. 4 shows a characteristic of astigmatism. (c) of FIG. 4 shows a characteristic of a distortion.

(a) to (c) of FIG. 6 are graphs showing characteristics of various aberrations of the image pickup lens 51. (a) of FIG. 6 shows a characteristic of a spherical aberration. (b) of FIG. 6 shows a characteristic of astigmatism. (c) of FIG. 6 shows a characteristic of a distortion.

The graphs of (a) to (c) of FIG. 2, (a) to (c) of FIG. 4, and (a) to (c) of FIG. 6 show small amounts of remaining aberrations (small difference in magnitude of each aberration with respect to the displacements along the normal direction to the optical axis La, i.e., along the Y direction of each of FIGS. 1, 3, and 5). This shows that the image pickup lenses of the present invention have good optical characteristics.

The spherical aberrations, the astigmatism, and the distortions are the results of aberrations on a total of six types of incident light of different wavelengths of 405 nm, 436 nm, 486 nm, 546 nm, 588 nm, and 656 nm.

Each of the graphs (a) and (b) of FIG. 2, (a) and (b) of FIG. 4, and (a) and (b) of FIG. 6 shows aberrations at different wavelengths of 405 nm, 436 nm, 486 nm, 546 nm, 588 nm, and 656 nm, with the curves arranged in this order starting from the left on the drawing.

In each of (b) of FIG. 2, (b) of FIG. 4, and (b) of FIG. 6, those curves which are comparatively large in band of fluctuation along the horizontal axis represent aberrations with respect to the tangential surface, and those curves which are comparatively small in band of fluctuation along the horizontal axis represent aberrations with respect to the sagittal surface.

The term "sagittal surface" means the trajectory of an age point as formed in an optical system of rotational symmetry by a ray of light (sagittal ray), among rays of light coming from an object point off the optical axis of the optical system and entering the optical system, which is included in a plane (sagittal plane) perpendicular to a plane containing a chief ray and the optical axis. The term "tangential surface" means an image surface that is formed by a beam of light (bundle of meridional rays) perpendicular to a bundle of sagittal rays and including a chief ray. Since the terms "sagittal surface" and "tangential surface" are both commonly-used optical terms, they will not be further explained.

Figure 13:
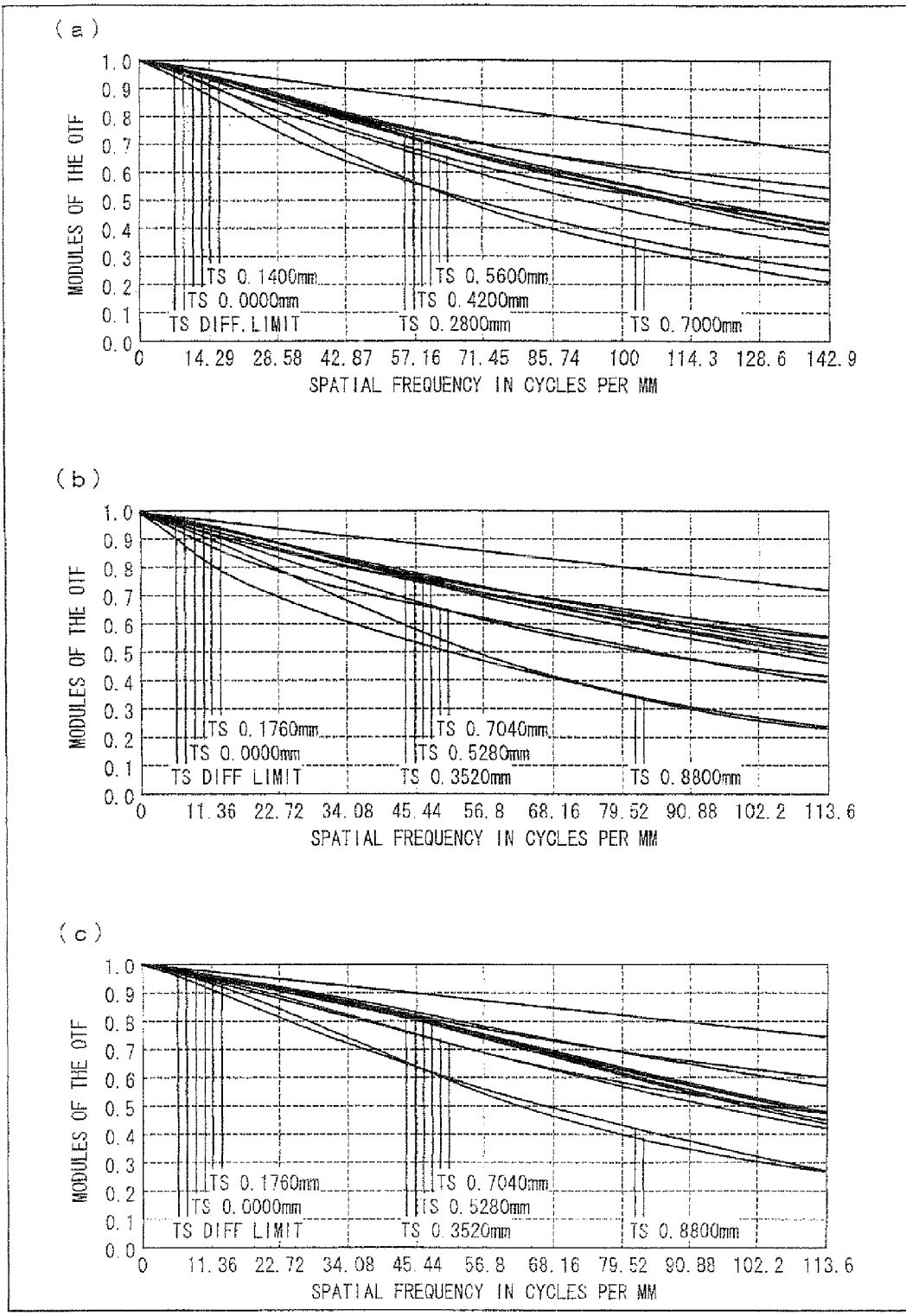
FIG. 13(a) through (c) of FIG. 13 are graphs showing MTFs (Modulation Transfer Functions), with respect to spatial frequency characteristics, of image pickup lenses of the present invention, wherein (a) of FIG. 13 shows a characteristic of the image pickup lens of FIG. 1, (b) of FIG. 13 shows a characteristic of the image pickup lens of FIG. 3, and (c) of FIG. 13 shows a characteristic of the image pickup lens of FIG. 5.

The graphs (a) to (c) of FIG. 13 show MTFs (Modulation Transfer Functions), with respect to spatial frequency characteristics, of the image pickup lenses 1, 31, and 51, respectively. Each of the graphs shows, for each of the image heights: h 0, h 0.2, h 0.8, and h 1.0, the MTFs on the sagittal surface and the tangential surface. In each of the graphs, the vertical axis indicates values of the MTFs whereas the horizontal axis indicates spatial frequencies. The spatial frequencies are those in the range of 0 to "Nyq./2" 1 p/mm. According to the graphs (a) to (c) of FIG. 13, each of the image pickup lenses of the present invention has a high MTF characteristic at any of the image heights h 0 to h 1.0 across the spatial frequencies corresponding to "Nyq./2" This allows each of the image pickup lenses to have an excellent resolution capability even in a periphery of a formed image.

Figure 14:
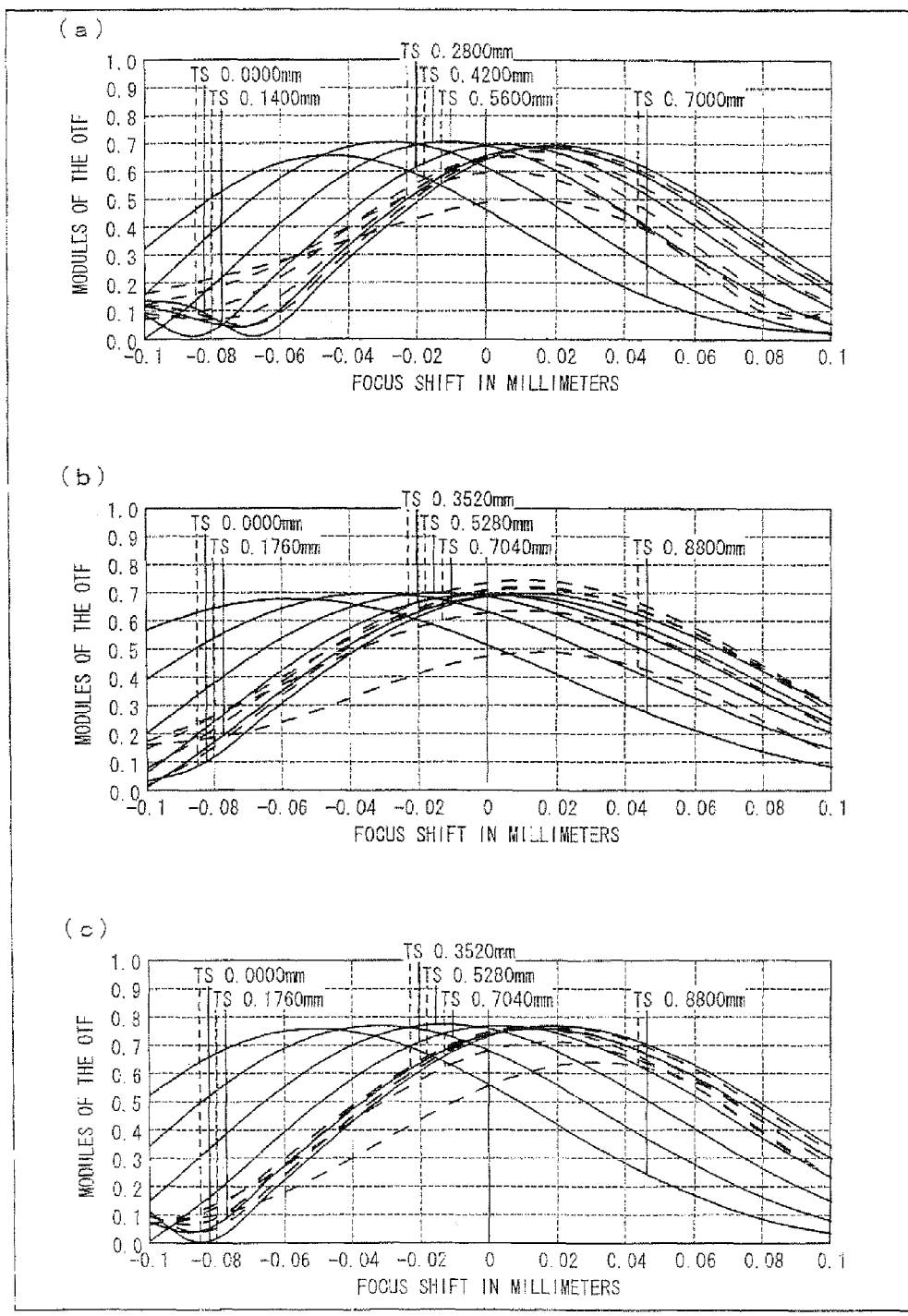
FIG. 14(a) through (c) of FIG. 14 are graphs showing changes of MTFs, with respect to positions of image surfaces, of the image pickup lenses of the present invention, wherein (a) of FIG. 14 shows a characteristic of the image pickup lens of FIG. 1, (b) of FIG. 14 shows a characteristic of the image pickup lens of FIG. 3, and (c) of FIG. 14 shows a characteristic of the image pickup lens of FIG. 5.

The graphs (a) to (c) of FIG. 14 show changes of MTFs, with respect to positions of the image surfaces (distances between the single lens L1 and the sensor), of the image pickup lenses 1, 31, and 51, respectively, i.e., the graphs shows so-called defocus MTFs. In the graphs, the vertical axis indicates values of the MTFs whereas the horizontal axis indicates focus shift amounts (amount by which the image surface is shifted along the optical axis La). Each of the graphs shows, for the image heights: h 0, h 0.2, h 0.8, and h 1.0, the MTFs on the sagittal surface and the tangential surface. The special frequencies are those in the range of 0 to "Nyq./4" 1 p/mm. Each of the graphs shows characteristic values across the spatial frequencies. In each of the graphs, all the curved lines corresponding to respective image heights show similar forms, i.e., similar focus shift characteristics. This indicates that field curvatures are satisfactorily corrected.

"Nyq." represents that Nyquist frequency of a sensor (solid-state image sensing device) which matches the specifications of each of the image pickup lenses of the present invention. A Nyquist frequency of the sensor indicates a value of a resolvable spatial frequency which value is found on the basis of a sensor pixel pitch. Specifically, a Nyquist frequency (unit: 1 p/mm) of the sensor is found by the following formula (5).

$$\text{Nyq.}=1/(\text{sensor pixel pitch}(\text{unit}: \mu m))/2 \qquad (5)$$

In order that the characteristics may be obtained which are shown in (a) to (c) of FIG. 13 and (a) to (c) of FIG. 14, rays of white light weighted as below were used as simulation light sources (not illustrated).

404.66 nm=0.13

435.84 nm=0.49

486.1327 nm=1.57

546.07 nm=3.12

587.5618 nm=3.18

656.2725 nm=1.51

Figure 7:
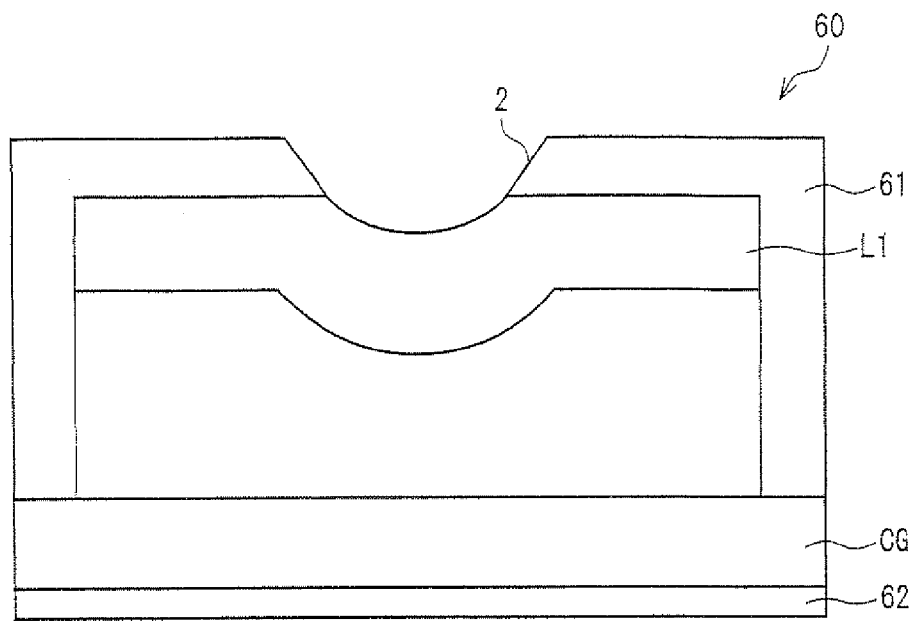
FIG. 7 is a cross-sectional view illustrating an arrangement of an image pickup module of the present invention.

FIG. 7 is a cross-sectional view illustrating an image pickup module 60 having an image pickup lens of the present invention.

Note that the single lenses L1 of the image pickup lenses of the present invention of FIGS. 1, 3, and 5 are partially illustrated for convenience of explanation. Specifically, each of FIGS. 1, 3, and 5 illustrates only a portion of the single lens L1 corresponding to its effective aperture (i.e., illustrates the portion having no edge portion). However, in general, the image pickup lenses and an image pickup module having any of the image pickup lenses are actually arranged such that the edge portions are provided to the peripheries of the effective apertures of the single lenses L1, as is the case with the image pickup module 60 of FIG. 7.

The arrangement in which the single lens L1 has its edge portion is an arrangement for realizing an image pickup lens and an image pickup module which reduce a possibility of deterioration of an optical characteristic, and which are suitable for reduction in manufacturing costs and mass-production.

Specifically, the image pickup lenses of the present invention each of which has the single lens L1 with its edge portion make it possible to easily secure a proper aspheric characteristic of the single lens L1. This makes it possible to reduce the possibility of deterioration of an optical characteristic.

Figure 10:
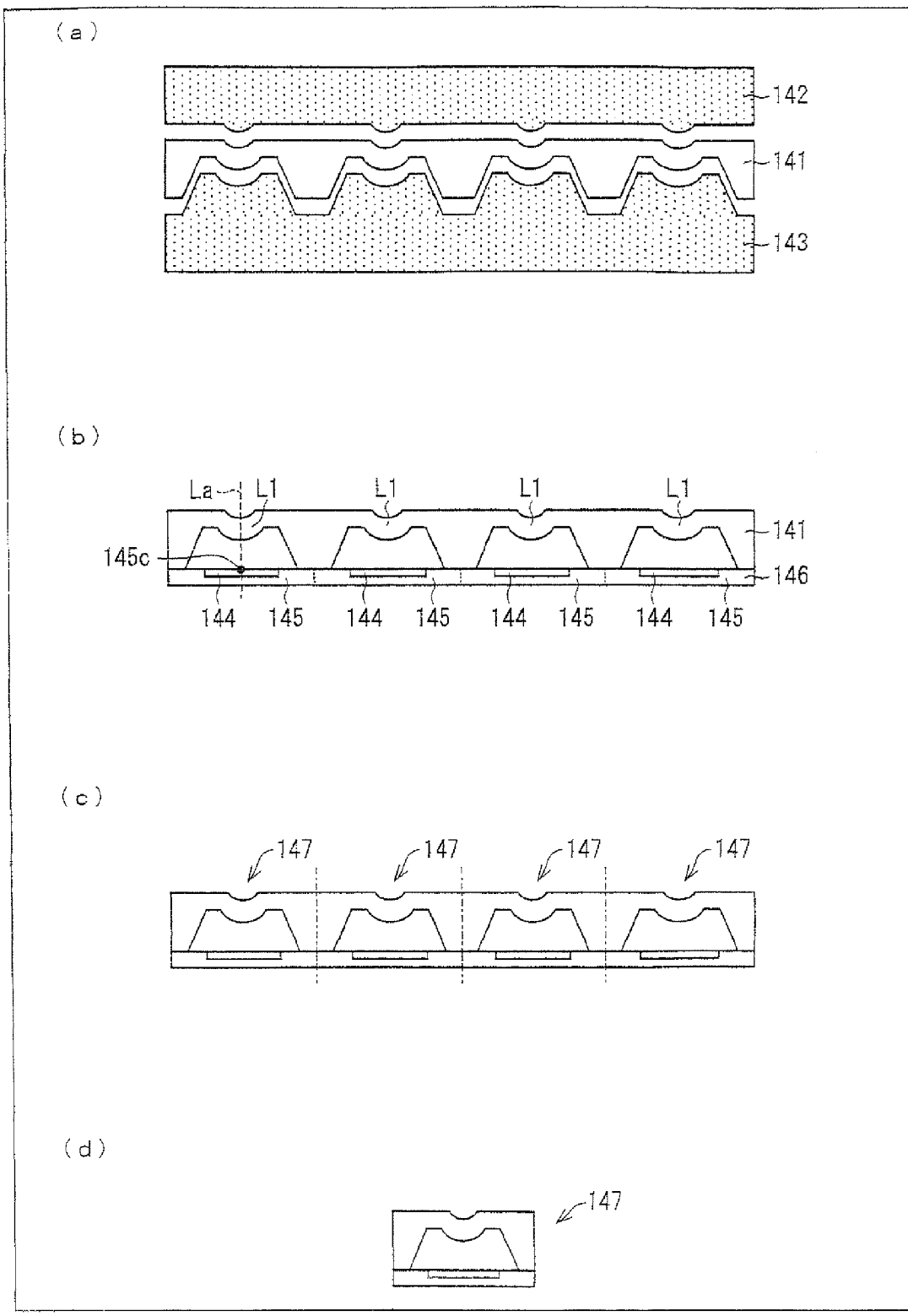
FIG. 10(a) through (d) of FIG. 10 are cross-sectional views illustrating another method of the present invention for manufacturing an image pickup lens and an image pickup module.

Further, in order to produce the lens array 141 (see (a) of FIG. 10) having portions molded as a plurality of single lenses L1, it is essential to provide each single lens L1 with the edge portion, due to the structure of the lens array 141. Thus, the edge portion is an indispensable element in a case where the image pickup lenses and the image pickup module of the present invention are manufactured in a wafer-level lens process so that reduction in manufacturing costs and mass-production may be realized.

The image pickup module 60 of FIG. 7 includes the single lens L1, the cover glass CG, a housing 61, and a sensor (solid-state image sensing device) 62. In the image pickup module 60, an aperture stop 2 is formed as a part of the housing 61. Specifically, the aperture stop 2 is formed so that the concave surface (surface S1) of the single lens L1 may be exposed upward from under the housing 61.

In other words, the image pickup module 60 is understood to include any of the image pickup lenses of the present invention, the housing 61, and the sensor 62.

The housing 61 is a housing for housing the image pickup lens. The housing 61 is made from a light-blocking material. The cover glass CG is mounted on the sensor 62.

The sensor 62 is provided on the image surface S5 (see FIG. 1 etc.). The sensor 62 is an image pickup device realized by a solid-state image sensing device such as a CCD image sensor or a CMOS image sensor. The use of a solid-state image sensing device as the sensor 62 allows the image pickup module 60 to be small in size and low in height. In particular, in image pickup modules 60 that are mounted into portable terminals (not shown) such as portable information terminals and portable phones, the use of solid-state image sensing devices in the sensors 62 makes it possible to realize image pickup modules that are high in resolving power, small in size, and low in height.

A pixel pitch of the sensor 62 is preferably equal to the sensor pixel pitch (see Table 4) of any of the image pickup lenses of the present invention. Accordingly, the pixel pitch of the sensor 62 is preferably less than 2.5 µm.

Adopting such a solid-state image sensing device allows the image pickup module 60 to make full use of the performance capabilities of the image pickup device having a large number of pixels.

The sensor 62 is preferably a solid-state image sensing device of the VGA class. This allows the image pickup module 60 to have an excellent resolution capability. Further, this allows the image pickup module 60 to have fewer lenses. This makes it possible to reduce factors which can cause a manufacturing tolerance. This makes the manufacture easy.

Image pickup modules having image pickup devices of the VGA class heretofore have each mainly had an image pickup lens constituted by two lenses. Providing, in such an image pickup module having an image pickup device of the VGA class, any of the image pickup lenses of the present invention constituted by a single lens (single lens L1 only) allows the image pickup module to have fewer lenses although having a slightly lower resolution, as compared to a case where an image pickup lens constituted by two lenses is provided in the image pickup module. This makes it possible to reduce factors which can cause a manufacturing tolerance. This makes the manufacture easy.

The image pickup module 60 produces the same effect as the image pickup lenses of the present invention.

In addition, any of the image pickup lenses of the present invention provided in the image pickup module 60 shows good values of various aberrations. For this reason, even if the image pickup module 60 does not include an adjustment mechanism (not illustrated) for adjusting the clearance between the image pickup lens and the sensor 62, nor a body tube (not illustrated), the adverse effects on the maintenance of a high resolving power are small. The omission of the adjustment mechanism and the body tube allows the image pickup module 60 to be smaller in size, lower in height, and lower in cost.

Because any of the image pickup lenses of the present invention has a broad permissible scope of manufacturing errors, the use of the image pickup lens allows the image pickup module 60 to be constituted as a simple-structured image pickup module without a mechanism for adjusting the distance between the lens and the image surface.

Figure 8:
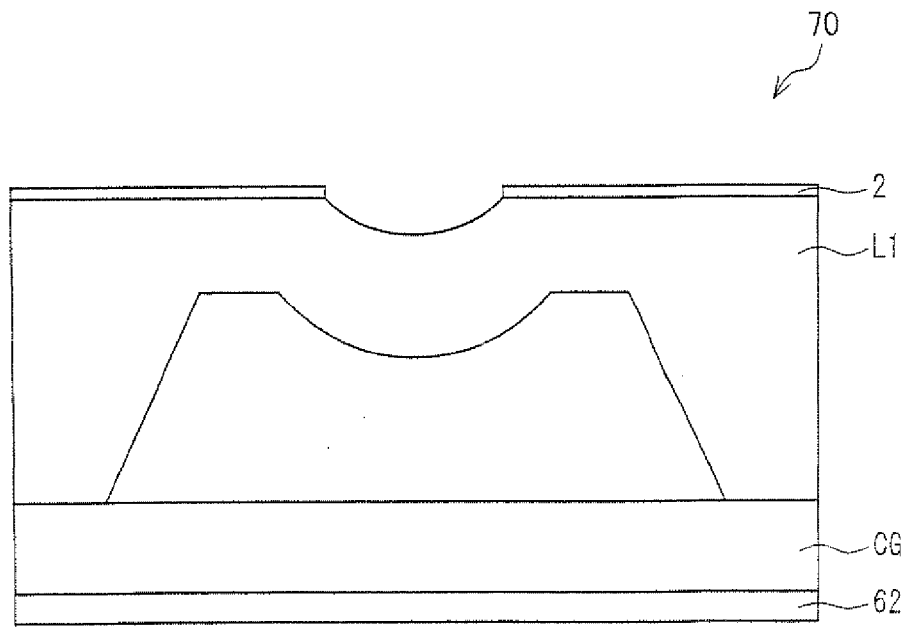
FIG. 8 is a cross-sectional view illustrating an arrangement of another image pickup module of the present invention.

An image pickup module 70 of FIG. 8 is an image pickup module obtained by omitting the housing 61 from the image pickup module 60 of FIG. 7. As a result, the image pickup module 70 has its aperture stop 2 so as to have substantially the same structure as each of the image pickup lenses 1, 31, and 51 of FIGS. 3, and 5.

Further, the image pickup module 70 of FIG. 8 differs from the image pickup module 60 of FIG. 7 in that the edge portion corresponding to that surface (surface S2) of the single lens L1 which faces the sensor 62 is provided so as to project toward the sensor 62. The edge portion is placed on the cover glass CG.

The image pickup module 70 does not need to have a housing 61 for housing the image pickup lens. The omission of the housing 61 allows the image pickup module 70 to be further smaller in size, further lower in height, and further lower in cost. The image pickup module 70 is based on the image pickup module 60 structured not to include an adjustment mechanism (not shown) or a body tube (not shown).

In other respects, the image pickup module 70 is arranged similarly to the image pickup module 60.

Figure 9:
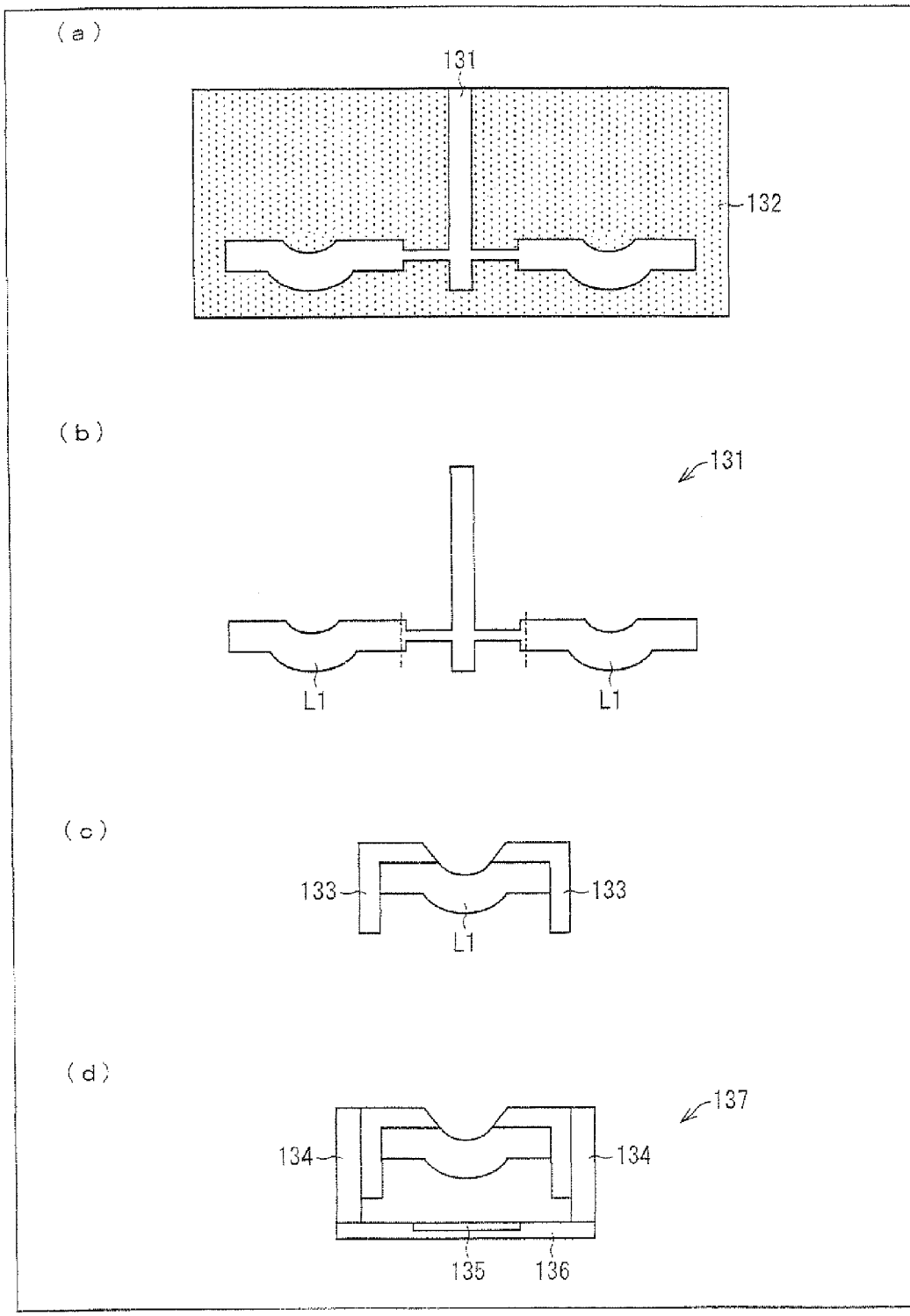
FIG. 9(a) through (d) of FIG. 9 are cross-sectional views illustrating a method of the present invention for manufacturing an image pickup lens and an image pickup module.

The following describes one method for manufacturing each of the image pickup lenses of the present invention and the image pickup module having the image pickup lens, with reference to (a) through (d) of FIG. 9.

The single lens L1 is produced mainly by injection molding with thermoplastic resin 131. In this process, the thermoplastic resin 131 softened by heat is forced into a mold 132 at a predetermined injection pressure (approximately 10 to 3,000 kgf/c) so that the mold 132 may be filled with the thermoplastic resin 131 (see (a) of FIG. 9).

The thermoplastic resin 131 molded into a plurality of single lenses L1 is taken out from the mold 132, and then divided into individual single lenses L1 (see (b) of FIG. 9).

(a) and (b) of FIG. 9 exemplify a case where two single lenses L1 are molded in a manner of batch-molding. Alternatively, three or more single lenses L1 may be molded in the manner. Alternatively, one single lens L1 may be molded in the manner.

A single lens L1 is fitted or pressed into a lens barrel (housing) 133 for assembly (see (c) of FIG. 9). The aperture stop 2 (see FIG. 1 etc.) is formed so as to have the same structure of the one in the image pickup module 60 of FIG. 7.

A semifinished image pickup module 137 shown in (c) of FIG. 9 is fitted into a body tube 134 for assembly. After that, a sensor 136 in which a cover glass 135 is attached to a light-receiving section is mounted on the image surface S5 (see FIG. 1 etc.) of the image pickup lens of the present invention constituted by the single lens L1. Thus, the image pickup module 137 is completed (see (d) of FIG. 9).

The thermoplastic resin 131, of which the single lens i.e., an injection molded lens, is made, has a deflection temperature under loading (heat distortion temperature) of approximately 130° C. For this reason, the thermoplastic resin 131 is insufficient in resistance to a thermal history (whose maximum temperature is approximately 260° C.) during execution of reflowing, which is a technique that is applied mainly to surface mounting. Therefore, the thermoplastic resin 131 cannot resist heat that is generated during reflowing.

Consequently, before the image pickup module 137 is mounted onto a substrate, only the sensor 136 section is mounted by reflowing. After that, a method of joining the single lens L1 section with resin or a mounting method of locally heating the area where the single lens L1 is mounted is adopted.

(d) of FIG. 9 illustrates a rectangle in the sensor 136, as the cover glass 135 included in the sensor 136. In each of the image pickup modules 60 and 70 (see FIGS. 7 and 8, respectively), the cover glass CG is attached onto substantially the entire surface of the sensor 62 (onto substantially the entire surface of the sensor 62 on the single lens L1 side). In the image pickup module 137, by contrast, the cover glass 135 is attached only onto the light-receiving section of the sensor 136.

The following describes another method for manufacturing each of the image pickup lenses of the present invention and the image pickup module having the image pickup lens, with reference to (a) through (d) of FIG. 10. The method corresponds to a wafer-level lens process which is more suitable as a manufacturing method.

Recent years, the development of a so-called heat-resistant camera module whose single lens L1 is made from thermosetting resin or UV curable resin (molding material) has been advanced. The image pickup module 147 described here is such a heat-resistant camera module whose single lens L1 is made from thermosetting resin, instead of being made from the thermoplastic resin 131 (see (a) of FIG. 9). Instead of the thermosetting resin, the UV curable resin can be adopted.

The reason why the single lens L1 is made from the thermosetting resin or the UV curable resin is that (i) batch-manufacturing a large number of image pickup modules 147 in a short time allows reduction in manufacturing costs thereof and (ii) reflowing thereof is allowed.

There have been proposed various techniques for manufacturing image pickup modules 147. Of these techniques, the aforementioned injection molding and the wafer-level lens process are representative. In particular, the wafer-level lens (reflowable lens) process has recently drawn attention as being more advantageous in terms of the time that it takes to manufacture image pickup modules and other comprehensive knowledge.

In the execution of the wafer-level lens process, it is necessary to prevent the single lens L1 from suffering from plastic deformation due to heat. Because of this necessity, wafer-level lenses (lens array) made from a highly heat-resistant thermosetting resin material or UV curable resin material that resists deformation even under heat have drawn attention as the single lens L1. Specifically, wafer-level lenses made from such a heat-resistant thermosetting resin material or UV curable resin material that does not suffer from plastic deformation even under heat of 260 to 280° C. for ten seconds or longer have drawn attention. According to the wafer-level lens process, image pickup modules 147 are manufactured as below. The thermosetting resin or the UV curable resin is molded into the lens array 141 having portions molded as many single lenses L1, in a manner of batch-molding by use of lens array-shaped molds 142 and 143. Then, a sensor array 146 is mounted on the lens array 141. Finally, the resulting product is divided into individual image pickup modules 147.

The following describes details of the wafer-level lens process.

In the wafer-level lens process, an array of lenses 141 is produced as below. First, the thermosetting resin is sandwiched between the lens array-shaped mold 142, which has a large number of convexities formed therein, and the lens array-shaped mold 143, which has a large number of concavities which are formed therein so as to correspond to the convexities. Then, the thermosetting resin is cured by heat generated by the lens array-shaped molds 142 and 143. Thus, the lens array 141 is manufactured which has lens portions each in the same form as a combination of one of the convexities and a corresponding one of the concavities (see (*a*) of FIG. 10).

In order that the lens array 141 is easily produced by use of the lens array-shaped molds 142 and 143, the step of (*a*) of FIG. 10 is carried out by use of (i) the lens array-shaped mold 142 having a large number of convexities each of which has a symmetrical shape to the surface S1 (see FIG. 1 etc.) of the single lens L1, and (ii) the lens array-shaped mold 143 having a large number of concavities which correspond respectively to the convexities and each of which has a symmetrical shape to the surface S2 (see FIG. 1 etc.) of the single lens L1.

In this process, an array of aperture stops (not illustrated), which integrally has a large number of aperture stops 2, can be attached to the lens array 141 so that those concavities of the lens array 141 may be exposed which correspond to surfaces S1 (see FIG. 1 etc.) of the single lenses L1. Alternatively, one aperture stop 2 can be attached to each of the single lenses L1. When and how the aperture stop(s) 2 is attached is not illustrated for convenience of explanation since it is not particularly limited.

Then, the sensor array 146, which integrally has a large number of sensors 145, is mounted onto the lens array 141 of (*a*) of FIG. 10 (see (*b*) of FIG. 10). Specifically, the sensor array 146 is mounted onto the lens array 141 so that an optical axis La of each of the single lenses L1 is aligned with a center 145*c* of a corresponding one of the sensors 145. Each sensor 145 is placed on the image surface S5 (see FIG. 1 etc.) of a corresponding image pickup lens of the present invention. Further, a cover glass 144 is attached to the light-receiving section of each sensor 145.

In the step shown in (*b*) of FIG. 10, the array of a large number of image pickup modules 147 is divided into individual image pickup modules 147 (see (*c*) of FIG. 10), whereby the image pickup modules 147 are completed (see (*d*) of FIG. 10).

(*b*) of FIG. 10 illustrate a rectangle in each sensor 145, as the cover glass 144 included in each sensor 145. In each of the image pickup modules 60 and 70 (see FIGS. 7 and 8, respectively), the cover glass CG is mounted onto substantially the entire surface of the sensor 62 (onto substantially the entire surface of the sensor 62 on the single lens L1 side). In the image pickup module 147, by contrast, a cover glass 144 is attached only onto the light-receiving section of each sensor 145.

In a case where the process, illustrated in (*b*) of FIG. 10, of providing the sensors 145 (sensor array 146) is omitted, and only the cover glasses 144 are provided so that an image pickup device may be omitted from each image pickup module 147, it is possible to easily manufacture the image pickup lenses in a wafer-level lens process.

When and how the cover glasses 135 and 144 are provided is not particularly limited. Thus, a cover glass (image surface protective glass) can be provided to the image pickup lens of the present invention or the image pickup module of the present invention in a manner illustrated in FIGS. 7 and 8 or in a manner illustrated in (*d*) of FIG. 9 and (*d*) of FIG. 10.

The image pickup module 147 thus manufactured can be the image pickup module 70 of FIG. 8. The image pickup lens thus manufactured can be any of the image pickup lenses of the present invention.

According to the wafer-level lens process shown above in (*a*) through (*d*) of FIG. 10, the cost of manufacturing image pickup modules 147 can be reduced by batch-manufacturing a large number of image pickup modules 147. Furthermore, in order to prevent the single lens L1 from suffering from plastic deformation due to heat (whose highest temperature is approximately 260° C.) that is generated by reflowing in mounting a completed image pickup module 147 on a substrate (not shown), it is more preferable that the single lens L1 be made from a heat-resistant thermosetting resin material or UV curable resin material that is resistant to heat of 260 to 280° C. for ten seconds or longer. This makes it possible to perform reflowing on the image pickup module 147. The application of a heat-resistant resin material to the wafer-level manufacturing steps makes it possible to inexpensively manufacture image pickup modules on which reflowing can be performed.

The following discusses those materials for the single lenses L1 which are suitable in manufacturing the image pickup modules 147.

Thermoplastic resin materials have been mainly used as materials for plastic lenses; therefore, there is a wide range of materials.

Figure 12:
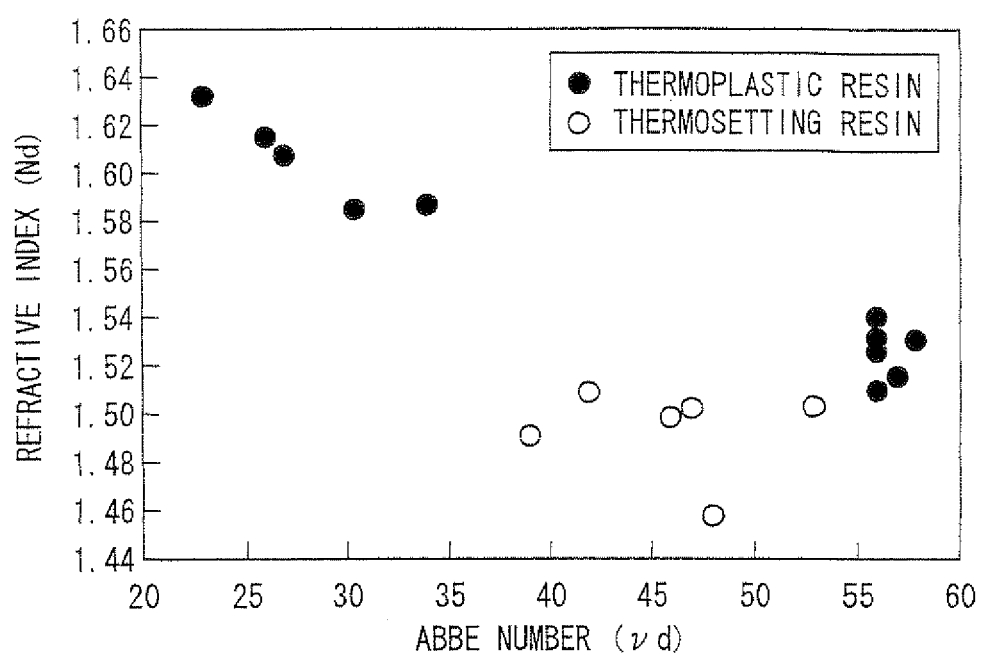
FIG. 12 is a graph showing the relationships shown in FIG. 11.

On the other hand, thermosetting resin materials and UV curable resin materials have not been fully developed for use as the single lenses L1 and, as such, are currently inferior to the thermoplastic resin materials in diversity and optical constant, and expensive. In general, the optical constant of a material with a low refractive index and low dispersivity is preferable. Further, it is preferable that there be a wide range of optical constants to choose from in optical design (see FIGS. 11 and 12).

As for the image pickup lens disclosed in Patent Literature 4, the single lens has a large center thickness of approximately 0.90 mm. Accordingly, the whole optical length is long. This leads to a problem of an insufficiently small size of the image pickup lens even if formulas shown in the Patent Literature 4, including the formulas (A) and (B), are satisfied.

In view of this, the image pickup lens of the present invention is arranged so as to satisfy the following formula (3):

$$d1 < 0.28 \text{ mm} \quad (3)$$

The image pickup lens of the present invention further satisfies the formula (3) so that the single lens L1 may have a small center thickness. This allows the image pickup lens to have a much smaller size and a much lower height.

As described above, the image pickup lens satisfies the formula (1) so that the value of "d1/d2" may be more than 0.080. This allows the image pickup lens to prevent a thickness dr of the lateral sides of the single lens from being extremely small due to its lowered height when the formula (2) is satisfied. As a result, molding the single lens is not very difficult. Thus, the image pickup lens makes it possible to easily mold the single lens and reduce a size and a height of the image pickup lens.

Further, according to the arrangement, the image pickup lens satisfies the formula (3) so that the single lens may have a large positive refracting power. This allows the single lens to converge more surely, to a desired point on the image surface, light from the peripheral of the object.

Further, the image pickup lens of the present invention is arranged such that the single lens has an Abbe number of less than 50.

This makes it possible to use, as a material for the single lens L1, a material having a relatively low Abbe number. Accordingly, the number of materials which can be adopted as materials for the single lens L1 can be increased. This makes it possible to reduce a possibility that there arises a difficulty in adopting that material for the single lens L1 which is suitable for the aforementioned wafer-level lens process (see Patent Literatures 5 and 6). Thus, since the image pickup lens can be manufactured by a wafer-level lens process, the image pickup lens is suitable for reduction in manufacturing costs and for mass-production.

Further, the image pickup lens of the present invention further includes: an image surface protective glass for protecting the image surface, the image surface protective glass being provided between the image surface and the single lens, the image surface protective glass having a thickness of more than 0.3 mm.

This makes it possible to relax a specification related to an allowable dust size and protect the image surface from physical damage. Protection of the image surface from physical damage is advantageous in carrying out a wafer-level lens process.

Further, the image pickup lens of the present invention has an F number of less than 4.

According to the arrangement, it is possible to realize an image pickup lens which forms a bright image.

Further, the image pickup lens of the present invention is arranged such that the single lens is made from a resin which is cured with heat or ultraviolet rays.

According to the arrangement, the single lens is made from the thermosetting resin or the UV (Ultra Violet) curable resin. This makes it possible to mold the resin into a plurality of single lenses so that the aforementioned lens array can be manufactured.

Thus, since the image pickup lens can be manufactured by a wafer-level lens process, the image pickup lens allows reduction in manufacturing costs and mass-production. This makes it possible to provide inexpensive image pickup lenses.

Further, in a case where the single lens is made from the thermosetting resin or the UV curable resin, it is possible to subject the image pickup lens to reflowing. In other words, the image pickup lens which can be subjected to reflowing can be realized by adopting a heat-resistant material for the single lens.

Further, the image pickup module of the present invention is arranged such that a pixel pitch of the solid-state image sensing device is less than 2.5 μm.

According to the arrangement, adopting such a solid-state image sensing device makes it possible to realize an image pickup module which makes full use of the performance capabilities of the image pickup device having a large number of pixels.

Further, the image pickup module of the present invention is arranged such that the solid-state image sensing device is an image pickup device of a VGA (Video Graphics Array) class.

According to the arrangement, adopting the image pickup device of the VGA class allows the image pickup module to have an excellent resolution capability. Further, this allows the image pickup module to have fewer lenses. This makes it possible to reduce factors which can cause a manufacturing tolerance. This makes the manufacture easy.

Further, the method of the present invention for manufacturing an image pickup lens and the method of the present invention for manufacturing an image pickup module are arranged such that the molding material is a resin which is cured with heat or ultraviolet rays.

The arrangement makes it possible to subject, to reflowing, the image pickup lens and the image pickup module which are manufactured by aforementioned respective methods. Further, the arrangement makes it possible to easily manufacture a lens array by molding a molding material into a plurality of single lenses.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to an image pickup lens and an image pickup module that are to be provided in a portable terminal; a method for manufacturing an image pickup lens; and a method for manufacturing an image pickup module.

| Reference Signs List | |
|---|---|
| 1, 31, and 51 | Image pickup lens (image pickup lens of the present invention) |
| 2 | Aperture stop |
| 3 | Object |
| 60, 70, 137, and 147 | Image pickup module |
| 62, 136, and 145 | Sensor (solid-state image sensing device) |
| 141 | Lens array |
| CG, 135, and 144 | Cover glass |
| d1 | Center thickness of single lens |
| d2 | Length in air between center of that surface of single lens which faces image surface and image surface |
| d1' | Thickness of lateral sides of single lens |
| e1 | Edge of that surface of single lens which faces object |
| e2 | Edge of that surface of single lens which faces image surface |
| L1 | Single lens |
| S1 | Surface of single lens which faces object |
| S2 | Surface of single lens which faces image surface |
| s1 | Center of that surface of single lens which faces object |
| s2 | Center of that surface of single lens which faces image surface |
| S5 | Image surface |

The invention claimed is:
1. An image pickup lens comprising:
an aperture stop; and
a single lens, the aperture stop and the single lens being arranged in this order along a direction from an object to an image surface, the single lens being a meniscus lens having a concave surface facing the object, said image pickup lens satisfying formulas (1) and (2):

$$0.080 < d1/d2 < 0.22 \quad (1);$$

and $$d1'/d1 < 1.00 \quad (2)$$

where:

d1 is a center thickness of the single lens;
d1' is a thickness of a lateral side of the single lens; and
d2 is a length in air between the image surface and a center of that surface of the single lens which faces the image surface.

2. The image pickup lens as set forth in claim 1, satisfying a formula (3):

$$d1 < 0.28 \text{ mm} \quad (3).$$

3. The image pickup lens as set forth in claim 1, wherein the single lens has an Abbe number of less than 50.

4. The image pickup lens as set forth in claim 1, further comprising: an image surface protective glass for protecting the image surface, the image surface protective glass being provided between the image surface and the single lens, the image surface protective glass having a thickness of more than 0.3 mm.

5. The image pickup lens as set forth in claim 1, having an F number of less than 4.

6. The image pickup lens as set forth in claim 1, wherein the single lens is made from a resin which is cured with heat or ultraviolet rays.

7. An image pickup module comprising:

an image pickup lens; and
a solid-state image sensing device provided on an image surface of the image pickup lens,
said image pickup lens including:
an aperture stop; and
a single lens,
the aperture stop and the single lens being arranged in this order along a direction from an object to the image surface,
the single lens being a meniscus lens having a concave surface facing the object,
said image pickup lens satisfying formulas (1) and (2):

$$0.080 < d1/d2 < 0.22 \quad (1);$$

and $$d1'/d1 < 1.00 \quad (2)$$

where:

d1 is a center thickness of the single lens;
d1' is a thickness of a lateral side of the single lens; and
d2 is a length in air between the image surface and a center of that surface of the single lens which faces the image surface.

8. The image pickup module as set forth in claim 7, wherein a pixel pitch of the solid-state image sensing device is less than 2.5 μm.

9. The image pickup module as set forth in claim 7, wherein the solid-state image sensing device is an image pickup device of a VGA class.

10. A method for manufacturing an image pickup lens, the image pickup lens including:

an aperture stop; and
a single lens,
the aperture stop and the single lens being arranged in this order along a direction from an object to an image surface,
the single lens being a meniscus lens having a concave surface facing the object,
said image pickup lens satisfying formulas (1) and (2):

$$0.080 < d1/d2 < 0.22 \quad (1);$$

and $$d1'/d1 < 1.00 \quad (2)$$

where:

d1 is a center thickness of the single lens;
d1' is a thickness of a lateral side of the single lens; and
d2 is a length in air between the image surface and a center of that surface of the single lens which faces the image surface,
said method comprising the steps of:
molding a molding material into a lens array, the lens array having portions each molded as the single lens; and
dividing the lens array into separate image pickup lenses.

11. The method as set forth in claim 10, wherein the molding material is a resin which is cured with heat or ultraviolet rays.

12. A method for manufacturing an image pickup module, the image pickup module including:

an image pickup lens; and
a solid-state image sensing device provided on an image surface of the image pickup lens,
said image pickup lens including:
an aperture stop; and
a single lens,
the aperture stop and the single lens being arranged in this order along a direction from an object to the image surface,
the single lens being a meniscus lens having a concave surface facing the object,
said image pickup lens satisfying formulas (1) and (2):

$$0.080 < d1/d2 < 0.22 \quad (1);$$

and $$d1'/d1 < 1.00 \quad (2)$$

where:

d1 is a center thickness of the single lens;
d1' is a thickness of a lateral side of the single lens; and
d2 is a length in air between the image surface and a center of that surface of the single lens which faces the image surface,
said method comprising the steps of:
molding a molding material into a lens array, the lens array having portions each molded as the single lens; and
dividing the lens array into separate image pickup modules.

13. The method as set forth in claim 12, wherein the molding material is a resin which is cured with heat or ultraviolet rays.

* * * * *